US010001318B2

(12) United States Patent
Kato et al.

(10) Patent No.: US 10,001,318 B2
(45) Date of Patent: Jun. 19, 2018

(54) HEAT PUMP DEVICE THAT DRAWS HEAT FROM BOTH THE ATMOSPHERE AND ANOTHER HEAT SOURCE

(71) Applicant: Mitsubishi Electric Corporation, Tokyo (JP)

(72) Inventors: Yohei Kato, Tokyo (JP); Yoshiro Aoyagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 741 days.

(21) Appl. No.: 14/400,372

(22) PCT Filed: Apr. 24, 2013

(86) PCT No.: PCT/JP2013/062133
§ 371 (c)(1),
(2) Date: Nov. 11, 2014

(87) PCT Pub. No.: WO2013/172166
PCT Pub. Date: Nov. 21, 2013

(65) Prior Publication Data
US 2015/0121913 A1 May 7, 2015

(30) Foreign Application Priority Data
May 18, 2012 (WO) .................. PCT/JP2012/003271

(51) Int. Cl.
| F25B 41/00 | (2006.01) |
|---|---|
| F25D 21/06 | (2006.01) |
| F25B 47/02 | (2006.01) |
| F24D 3/18 | (2006.01) |
| F25B 27/00 | (2006.01) |
| F25D 21/00 | (2006.01) |
| F25B 13/00 | (2006.01) |
| F25B 49/02 | (2006.01) |

(52) U.S. Cl.
CPC .............. *F25D 21/06* (2013.01); *F24D 3/18* (2013.01); *F25B 13/00* (2013.01); *F25B 27/005* (2013.01);
(Continued)

(58) Field of Classification Search
CPC ........ F25D 21/06; F25D 21/004; F25B 49/02; F25B 2313/002; F25B 2313/02542; F24F 2011/0087
(Continued)

(56) References Cited

U.S. PATENT DOCUMENTS 6,250,090 B1 *  6/2001  Mei ......................... F25B 41/00
                                                            62/155
6,286,326 B1 *  9/2001  Kopko ................... F25D 17/065
                                                            62/179

FOREIGN PATENT DOCUMENTS

| JP | 53-016927 B2 | 6/1978 |
|---|---|---|
| JP | 58-85076 A | 5/1983 |

(Continued)

OTHER PUBLICATIONS

Aoyama, Yutaka, JP 2009-243802, English Translation, European Patent Office.*
(Continued)

*Primary Examiner* — Frantz Jules
*Assistant Examiner* — Steve Tanenbaum
(74) *Attorney, Agent, or Firm* — Posz Law Group, PLC

(57) ABSTRACT

During heat applying operation, both an air-source heat exchanger that exchanges heat with the atmosphere as a heat source and an earth-source heat exchanger that uses geothermal heat as a heat source serve as evaporators to collect heat from the atmosphere and the geothermal heat. During defrosting operation, while a four-way valve is switched to cause the air-source heat exchanger to serve as a radiator, and the earth-source heat exchanger to serve as an evaporator to collect the geothermal heat, and the collected geothermal heat is collected in the main circuit via the sub-circuit.

8 Claims, 13 Drawing Sheets

(52) U.S. Cl.
CPC ............ *F25B 47/025* (2013.01); *F25B 49/02* (2013.01); *F25D 21/004* (2013.01); *F24D 2200/11* (2013.01); *F24D 2200/12* (2013.01); *F24F 11/41* (2018.01); *F25B 2313/002* (2013.01); *F25B 2313/02531* (2013.01); *F25B 2313/02533* (2013.01); *F25B 2313/02542* (2013.01); *F25B 2313/02731* (2013.01); *F25B 2313/02741* (2013.01); *F25B 2600/2507* (2013.01); *Y02B 10/40* (2013.01)

(58) Field of Classification Search
USPC .............................................................. 62/81
See application file for complete search history.

(56) References Cited

FOREIGN PATENT DOCUMENTS

| JP | 61-272558 A | 12/1986 |
|---|---|---|
| JP | 03-117866 A | 5/1991 |
| JP | 08-086528 A | 4/1996 |
| JP | 2006-125769 A | 5/2006 |
| JP | 2006-284022 A | 10/2006 |
| JP | 2006284022 A * | 10/2006 |
| JP | 2009-243802 A | 10/2009 |
| JP | 2009-250495 A | 10/2009 |
| JP | 2009243802 A * | 10/2009 |
| JP | 2011-179692 A | 9/2011 |
| WO | 2010/143373 A1 | 12/2010 |

OTHER PUBLICATIONS

Partial supplementary European search report dated May 30, 2016 in the corresponding EP application No. 13791128.5.
International Search Report of the International Searching Authority dated Jul. 30, 2013 for the corresponding international application No. PCT/JP2013/062133 (and English translation).
Office Action dated Jul. 7, 2015 in corresponding JP patent application No. 2014-515556 (and English translation).
Office Action dated Sep. 29, 2015 in the corresponding JP application No. 2014-515556 (with English translation).
Extended European Search Report dated Nov. 2, 2016 issued in corresponding EP patent application No. 13791128.5.

* cited by examiner

COOLING OPERATION

DEFROSTING OPERATION

HEATING OPERATION

DEFROSTING OPERATION

HEATING OPERATION

DEFROSTING OPERATION

HEATING OPERATION

DEFROSTING OPERATION

F I G. 2 3
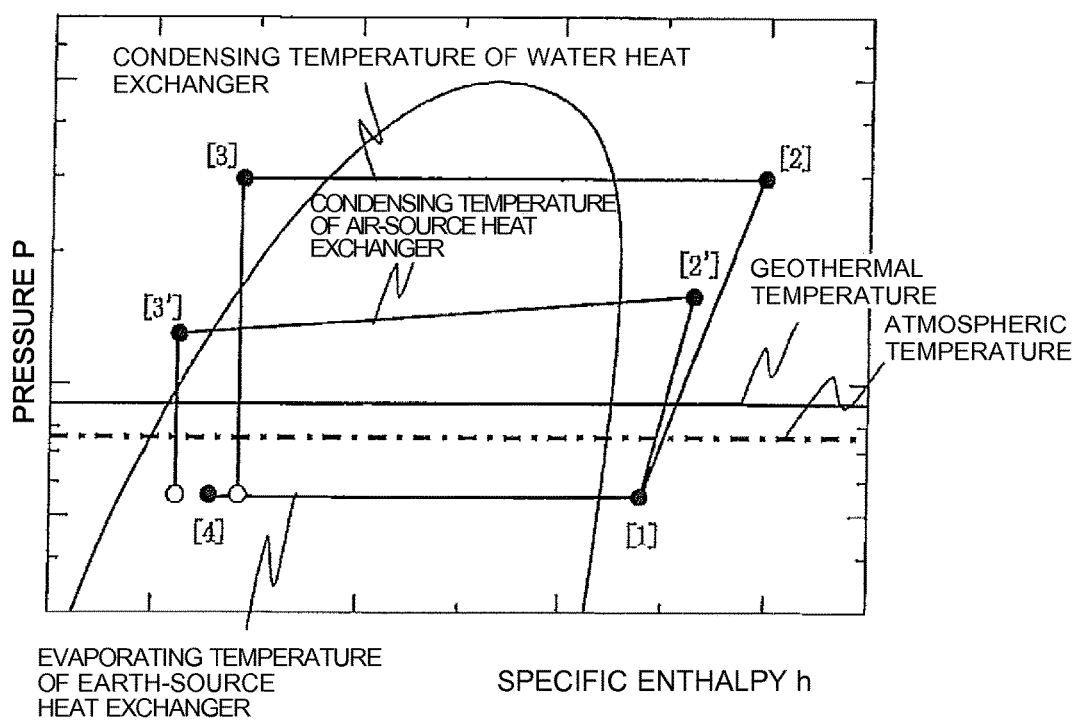

HEAT PUMP DEVICE THAT DRAWS HEAT FROM BOTH THE ATMOSPHERE AND ANOTHER HEAT SOURCE

CROSS REFERENCE TO RELATED APPLICATIONS

This application is a U.S. national stage application of PCT/JP2013/062133 filed on Apr. 24, 2013, which claims priority to international application no. PCT/JP2012/003271, filed on May 18, 2012, the contents of which are incorporated herein by reference.

TECHNICAL FIELD

The present invention relates to a heat pump device.

BACKGROUND

A heat pump device used in a heating and cooling apparatus or a water heater generally uses air as a heat source.

In addition, in a region where the atmospheric temperature is low, a heat pump that uses geothermal heat during heating has also been used recently.

In an air-source heat pump device which uses the heat of the atmosphere as a heat source, when the atmospheric temperature is low during heating operation, the heating capacity may be decreased due to a decrease in suction pressure, frost, or the like. As described above, the operating efficiency of the heat pump device depends on the atmospheric temperature.

In a geothermal heat pump device which uses geothermal heat, when the underground temperature is higher than the atmospheric temperature, the operating efficiency is higher than that of the air-source heat pump since it is possible to increase an amount of collected heat. However, when the underground temperature is lower than the atmospheric temperature, the operating efficiency is lower than that of the air-source heat pump device.

In addition, the underground temperature is generally less varied throughout the year than the atmospheric temperature, but its variation range depends on a region, a depth, and a season, and thus the operating efficiency is lower than that of the air-source heat pump in some cases.

As a solution to these problems, Patent Literature 1 discloses a technique to switch between an air heat exchanger installed on the ground and an underground heat exchanger buried underground in accordance with a result of comparison between the atmospheric temperature and the underground temperature.

PATENT LITERATURE

Patent Literature 1: Japanese Unexamined Patent Application Publication No. 2006-125769 (FIG. 1, FIG. 3)

As disclosed in Patent Literature 1, in the case where the underground heat exchanger and the air heat exchanger are selectively used depending on the underground temperature and the atmospheric temperature, the underground heat exchanger and the air heat exchanger are designed for their sizes such that the processing capacities thereof are the same. In general, an underground heat exchanger needs to have a larger size than that of an air heat exchanger in order to obtain the same processing capacity, and also needs to be buried underground and requires construction cost for a digging operation and the like. Thus, in a configuration in which an underground heat exchanger having the same processing capacity as that of an air heat exchanger is provided, a significant increase in cost is caused as compared to a heat pump device using solely an air heat source or an underground heat source.

Thus, when an underground heat exchanger and an air heat exchanger are not selectively used to collect heat from either one but heat is collected simultaneously from the atmosphere and the underground, the air heat exchanger compensates for a part of an amount of heat collected by the underground heat exchanger. Therefore, it is possible to reduce the necessary size of the underground heat exchanger, and there is the advantageous that it is possible to reduce the system cost.

However, in the configuration in which heat is collected simultaneously from the atmosphere and the underground, for example, when the load of a room is low and the power input to a compressor is low, the power of a geothermal heat pump provided in an earth-source side circuit including the underground heat exchanger accounts for an increased proportion of the entire system. In this case, even when the temperature of the atmosphere is low (e.g., around 0 degrees C.), the system efficiency may be higher when heat is collected using the air heat exchanger than when heat is collected using the underground heat exchanger. In this case, heat is collected using the air heat exchanger, the air heat exchanger serves as an evaporator in the low-temperature atmosphere, and thus frost occurs on the air heat exchanger. Therefore, it is necessary to perform defrosting operation in order to prevent a decrease in heat exchange performance of the air heat exchanger due to frost.

As a general defrosting method of a heat pump device using an air heat exchanger, a method in which an amount of work of a compressor is used as a heat source and a refrigerant discharged from the compressor is supplied directly to an air heat exchanger (to be referred to as a hot gas method hereinafter) or a method in which a refrigerant flow path is switched for cooling operation and heat on a load side (indoor side) is collected and used as a heat source for defrosting (to be referred to as a reverse method hereinafter), is used.

In the hot gas method, since no heat is rejected to the load side, the comfort is maintained. However, since an amount of heat used for defrosting is only the amount of work of the compressor, there is the drawback that the defrosting period of time is lengthened and the power consumption increases. In addition, in the reverse method, since the heat on the load side is collected, an amount of heat used for defrosting is large, and the defrosting period of time is short, but there is the drawback that the comfort is deteriorated.

Meanwhile, in the recent years, other than the atmosphere, geothermal heat has been increasingly used as a heat source in a heat pump device as described above, but use of other heat sources other than geothermal heat has also been desired.

SUMMARY

The present invention has been made in view of such points, and an object of the present invention is to provide a heat pump device that has a configuration of collecting heat from both the atmosphere and another heat source and is able to suppress deterioration of the comfort and the power consumption during defrosting operation.

A heat pump device according to the present invention includes: a refrigerant circuit which includes a main circuit in which a compressor, a refrigerant flow path of a load side heat exchanger, a first pressure reducing device, and a first heat source heat exchanger configured to exchange heat with atmosphere are connected in order, and through which a refrigerant circulates, and a sub-circuit in which a second pressure reducing device and a refrigerant flow path of a second heat source heat exchanger are connected in series with a branch pipe branching from a pipe defined between the first pressure reducing device and the load side heat exchanger of the main circuit and which is switched by a first switching device such that a connection destination, on a side opposite to the second pressure reducing device, of the refrigerant flow path of the second heat source heat exchanger is on a junction and branch point side with respect to the first heat source heat exchanger or an end of the compressor on a suction side thereof; a heat exchange medium circuit which includes a heat exchange medium flow path of the second heat source heat exchanger, and through which a heat exchange medium exchanging heat with another heat source different from the atmosphere to take away heat of the other heat source circulates; and a controller configured to control the first switching device. During defrosting operation, the controller causes the first heat source heat exchanger to serve as a radiator and the second heat source heat exchanger to serve as an evaporator, switches the first switching device to the suction side of the compressor, and allows the heat collected from the other heat source by the heat exchange medium circuit to be collected in the main circuit via the sub-circuit upon heat exchange in the second heat source heat exchanger and be used as a heat source for defrosting of the second heat source heat exchanger.

According to the present invention, it is possible to use a heat source other than the atmosphere as a heat source for defrosting, and it is possible to suppress power consumption during defrosting operation without deterioration of the comfort.

BRIEF DESCRIPTION OF DRAWINGS

FIG. 23 is a p-h diagram during defrosting operation in FIG. 22.

DETAILED DESCRIPTION

Embodiments will be described below assuming a load side apparatus to which a heat pump device is applied as an air-conditioning apparatus that performs cooling or heating.

Embodiment 1

Figure 1:
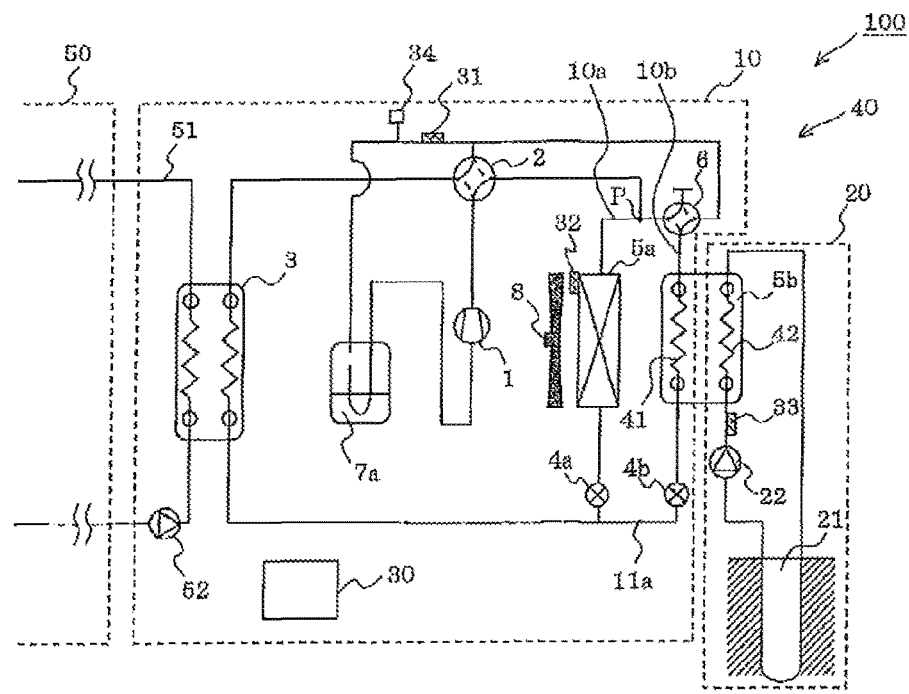
FIG. 1 is a diagram showing a refrigerant circuit of an air-conditioning apparatus to which a heat pump device according to Embodiment 1 of the present invention is applied.

FIG. 1 is a diagram showing a refrigerant circuit of an air-conditioning apparatus to which a heat pump device of Embodiment 1 of the present invention is applied.

An air-conditioning apparatus 100 includes a heat pump device 40 and a load side circuit 51 through which a load side medium circulates, and also includes a load side device 50 that performs cooling or heating with the heat pump device 40 as a heat source.

<<Heat Pump Device>>

The heat pump device 40 includes a refrigerant circuit 10 through which a refrigerant circulates, an earth-source side circuit 20, and a controller 30, and is installed outdoors.

<Refrigerant Circuit>

The refrigerant circuit 10 includes a main circuit 10a in which a compressor 1, a four-way valve 2 serving as a second switching device, a water heat exchanger 3 serving as a load side heat exchanger, an expansion valve 4a serving as a first pressure reducing device, and an air-source heat exchanger 5a serving as a first heat source heat exchanger are connected in order, and through which the refrigerant circulates, and a sub-circuit 10b. In the sub-circuit 10b, an expansion valve 4b and a refrigerant flow path 41 of an earth-source heat exchanger 5b are connected in series with a branch pipe 11a branching from a pipe defined between the expansion valve 4a and the water heat exchanger 3 of the main circuit 10a, and the refrigerant flow path 41 of the earth-source heat exchanger 5b is connected, on its side opposite to the expansion valve 4b, to the air-source heat exchanger 5a (the end of the air-source heat exchanger 5a on its side opposite to the expansion valve 4a) or the end of the compressor 1 on its suction side via a three-way valve 6 serving as a first switching device. In the main circuit 10a, a refrigerant container 7a is provided which serves as a buffer container for preventing rapid liquid return to the compressor 1. The refrigerant container 7a also serves as a container that stores an excess refrigerant.

(Compressor)

The compressor 1 is implemented in, for example, a completely hermetically sealed compressor, and has a configuration in which an electric motor portion (not shown) and a compressing portion (not shown) are housed in a compressor shell (not shown). A low-pressure refrigerant drawn into the compressor 1 by suction is compressed into a high-temperature and high-pressure refrigerant and discharged from the compressor 1. The rotation speed of the compressor 1 is controlled via an inverter (not shown) by the controller 30, thereby controlling the capacity of the heat pump device 40.

(Water Heat Exchanger)

The water heat exchanger 3 exchanges heat between the load side medium (in this case, water) in a water circuit 51 for cooling and heating which serves as a load side circuit 51 of the load side device 50 and the refrigerant in the refrigerant circuit 10. The water circulates through the water circuit 51 by a pump 52. In heating, the water heat exchanger 3 serves as a condenser and heats the water with the heat of the refrigerant in the refrigerant circuit 10 to generate hot water. In cooling, the water heat exchanger 3 serves as an evaporator and cools the water with the cooling energy of the refrigerant in the refrigerant circuit 10 to generate cold water. A room is heated or cooled by using the hot water or cold water. Examples of the form of the heat exchanger include a plate heat exchanger in which plates are stacked, and a double pipe heat exchanger including a heat-transfer pipe through which a refrigerant flows and a heat-transfer pipe through which water flows. Either form may be used in Embodiment 1. The load side medium that circulates through the load side circuit 51 is not limited to water, and may be an antifreeze solution such as brine.

(Expansion Valve)

The expansion valve 4a adjusts the flow rate of the refrigerant flowing through the air-source heat exchanger 5a. In addition, the expansion valve 4b serving as a second pressure reducing device adjusts the flow rate of the refrigerant flowing through an underground heat exchanger 21. The opening degrees of the expansion valves 4a and 4b are variably set on the basis of a control signal from the controller 30. Each expansion valve can not only be an electronic expansion valve whose opening degree can be changed in accordance with an electrical signal, but also be an expansion valve in which a plurality of orifices or capillaries are connected in parallel and the flow rate of the refrigerant flowing into the heat exchanger is controllable through an operation of opening/closing a valve such as a solenoid valve.

(Air-Source Heat Exchanger)

The air-source heat exchanger 5a is implemented in, for example, a fin-and-tube heat exchanger formed from copper or aluminum. The air-source heat exchanger 5a exchanges heat between the refrigerant and the outdoor air supplied from a fan 8 serving as a heat medium transfer device.

(Three-Way Valve)

The three-way valve 6, which serves as a first switching device, is used to switch the flow pattern of the refrigerant in the earth-source heat exchanger 5b between the duration of normal operation (heating operation or cooling operation) and the duration of the defrosting operation of the air-source heat exchanger 5a. Specifically, during normal operation, the flow pattern of the refrigerant that leaves the earth-source heat exchanger 5b is switched to the one which enables entrance to the air-source heat exchanger 5a such that both the air-source heat exchanger 5a and the earth-source heat exchanger 5b serve as condensers (radiators) or evaporators. On the other hand, during defrosting operation, the flow pattern of the refrigerant that leaves the earth-source heat exchanger 5b is switched to the one which enables entrance to the end of the compressor 1 on its suction side such that the air-source heat exchanger 5a serves as a condenser and the earth-source heat exchanger 5b serves as an evaporator.

(Four-Way Valve)

The four-way valve 2, which serves as a second switching device, is used to switch the flow pattern of the refrigerant in the refrigerant circuit 10. By switching the flow path, the water heat exchanger 3 can be used as a condenser during heating operation and as an evaporator during cooling operation.

<<Earth-Source Side Circuit>>

The earth-source side circuit 20 serving as a heat exchange medium circuit is configured such that an earth-source side medium flow path 42 of the earth-source heat exchanger 5b serving as a second heat source heat exchanger, the underground heat exchanger 21 that is buried underground, and a geothermal heat pump 22 are connected in order, and an earth-source side medium serving as a heat exchange medium implemented using an antifreeze solution such as brine circulates through them, thereby collecting geothermal heat.

(Underground Heat Exchanger)

The underground heat exchanger 21 includes, for example, a group of heat collecting pipes that are formed in an almost U shape, is buried vertically or horizontally underground, and is made of a resin. The underground heat exchanger 21 has a heat exchange capacity that varies depending on where or how deep the group of heat collecting pipes is buried. In the underground heat exchanger 21, the earth-source side medium passing through it collects heat from the underground.

(Earth-Source Heat Exchanger)

The earth-source heat exchanger 5b exchanges heat between the refrigerant circulating through the refrigerant circuit 10 and the earth-source side medium circulating through the earth-source side circuit 20. In the earth-source heat exchanger 5b, the earth-source side medium having collected geothermal heat by the underground heat exchanger 21 flows into the earth-source side medium flow path 42, and thus the heat collected from the underground by the underground heat exchanger 21 is transmitted to the refrigerant in the refrigerant flow path 41. Accordingly, the refrigerant circuit 10 collects the geothermal heat. Similarly to the water heat exchanger 3, examples of the form of the earth-source heat exchanger 5b include a plate heat exchanger and a double pipe heat exchanger, and either form may be used.

<Explanation of Sensor>

The heat pump device 40 is provided with a temperature or pressure sensor where necessary. A value detected by each sensor is input to the controller 30 and used to control the operation of the heat pump device 40, for example, to control the capacity of the compressor 1 and controlling the opening degrees of the expansion valves 4a and 4b. Referring to FIG. 1, a refrigerant temperature sensor 31, an atmospheric temperature sensor 32, and a geothermal temperature sensor 33 are provided.

The refrigerant temperature sensor 31 detects the saturation temperature of a low-pressure refrigerant in the refrigerant circuit 10. The atmospheric temperature sensor 32 detects the temperature of the atmosphere which serves as a heat source side heat medium. The geothermal temperature sensor 33 detects the temperature (geothermal temperature) of the earth-source side medium pumped up from the underground heat exchanger 21 by the geothermal heat pump 22. As shown in FIG. 1, the refrigerant temperature sensor 31 may be a suction pressure sensor 34 that detects the pressure of the refrigerant on the suction side of the compressor 1. In this case, the refrigerant pressure obtained by the suction pressure sensor 34 may be converted into a refrigerant saturation temperature by the controller 30.

Figure 2:
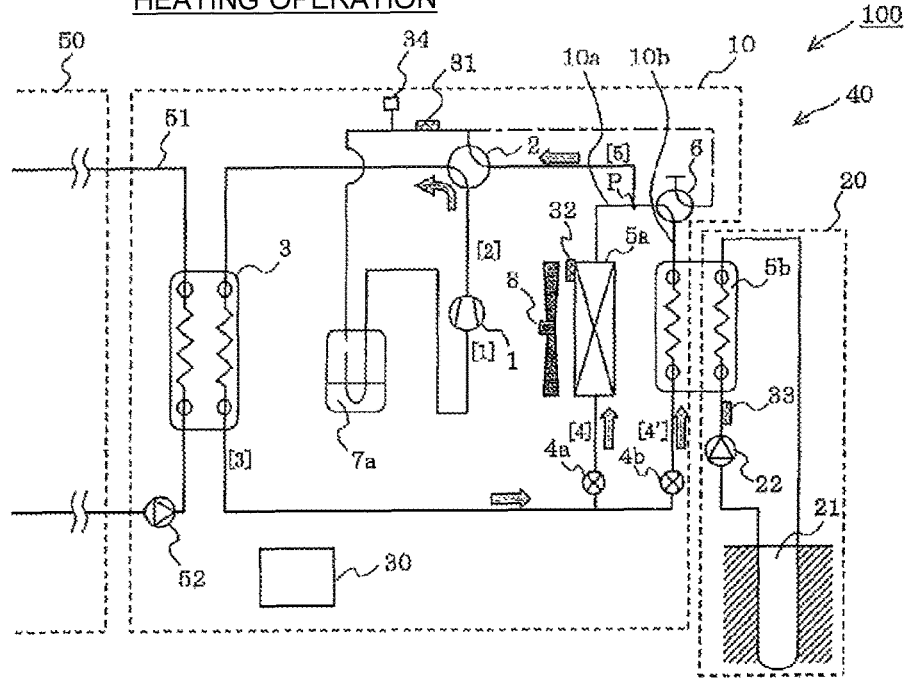
FIG. 2 is a diagram showing flow of a refrigerant during heating operation in Embodiment 1.
Figure 3:
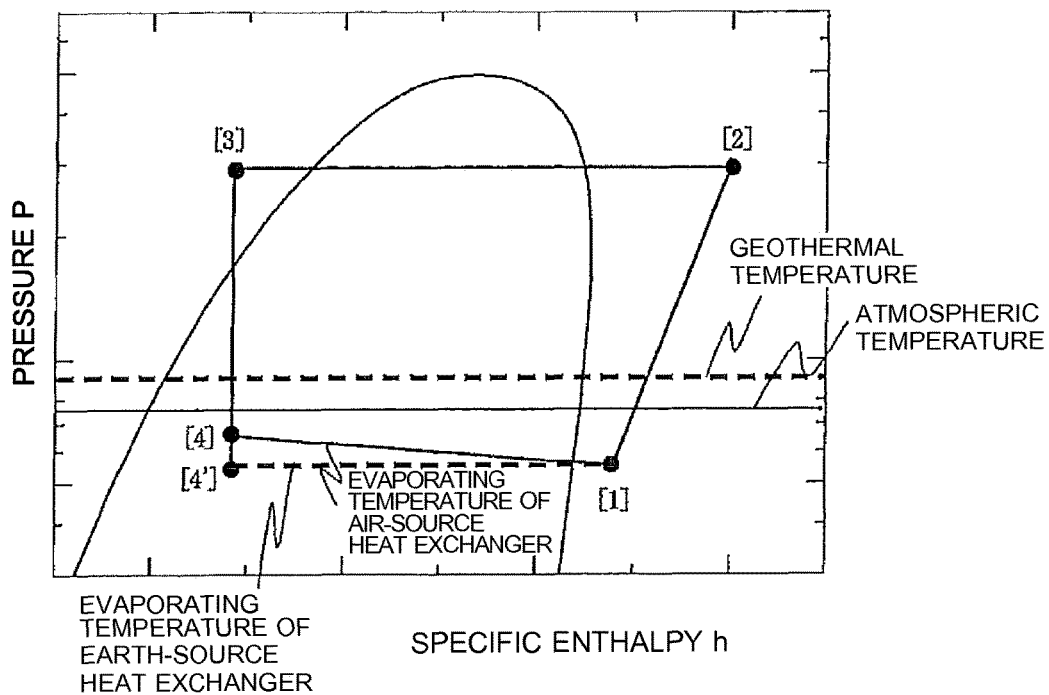
FIG. 3 is a p-h diagram during heating operation in FIG. 2.
Figure 4:
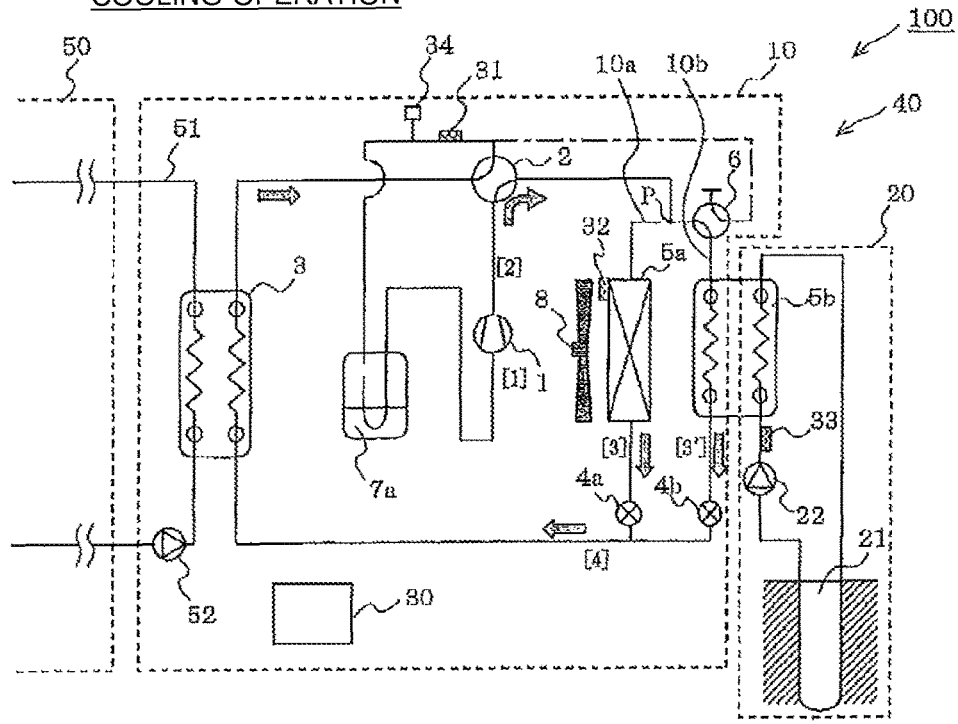
FIG. 4 is a diagram showing flow of the refrigerant during cooling operation in Embodiment 1.
Figure 5:
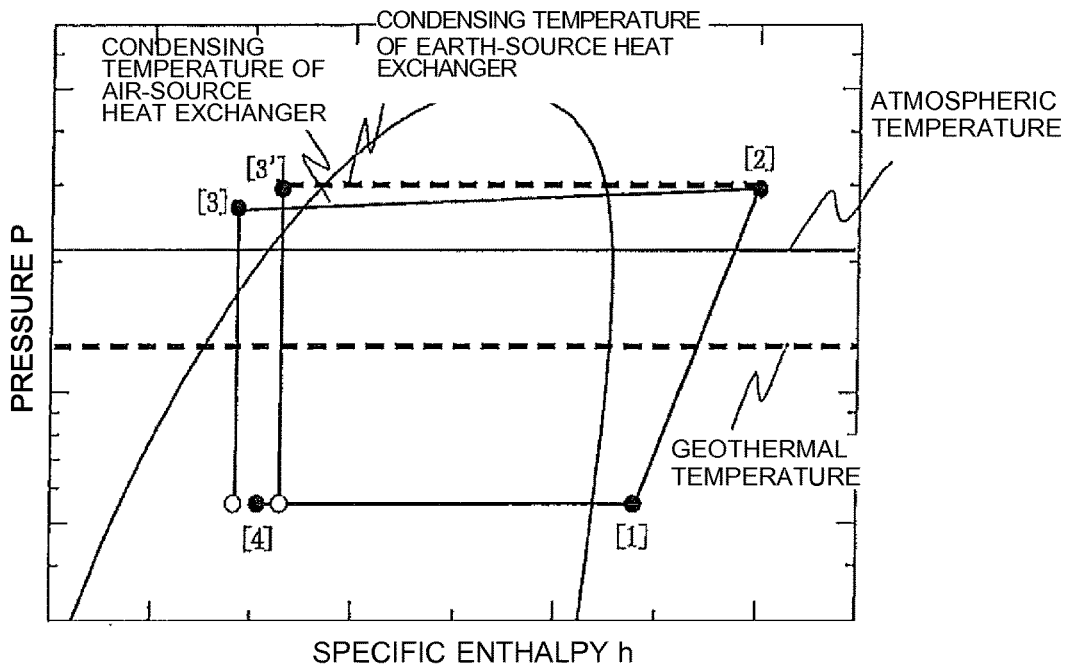
FIG. 5 is a p-h diagram during cooling operation in FIG. 4.
Figure 6:
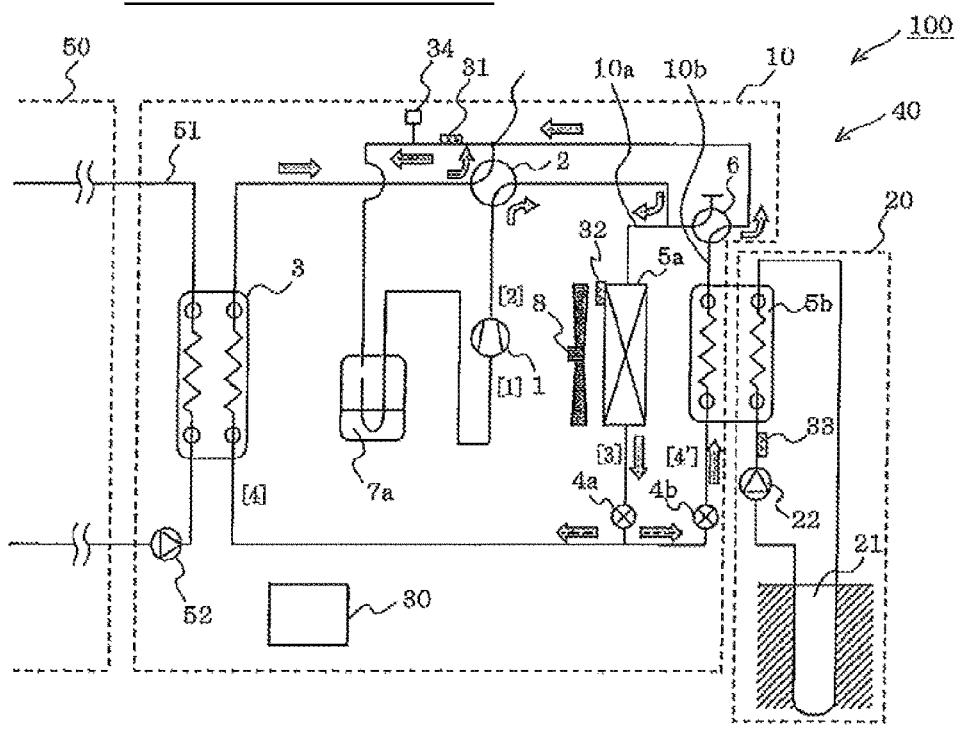
FIG. 6 is a diagram showing flow of the refrigerant during defrosting operation in Embodiment 1.
Figure 7:
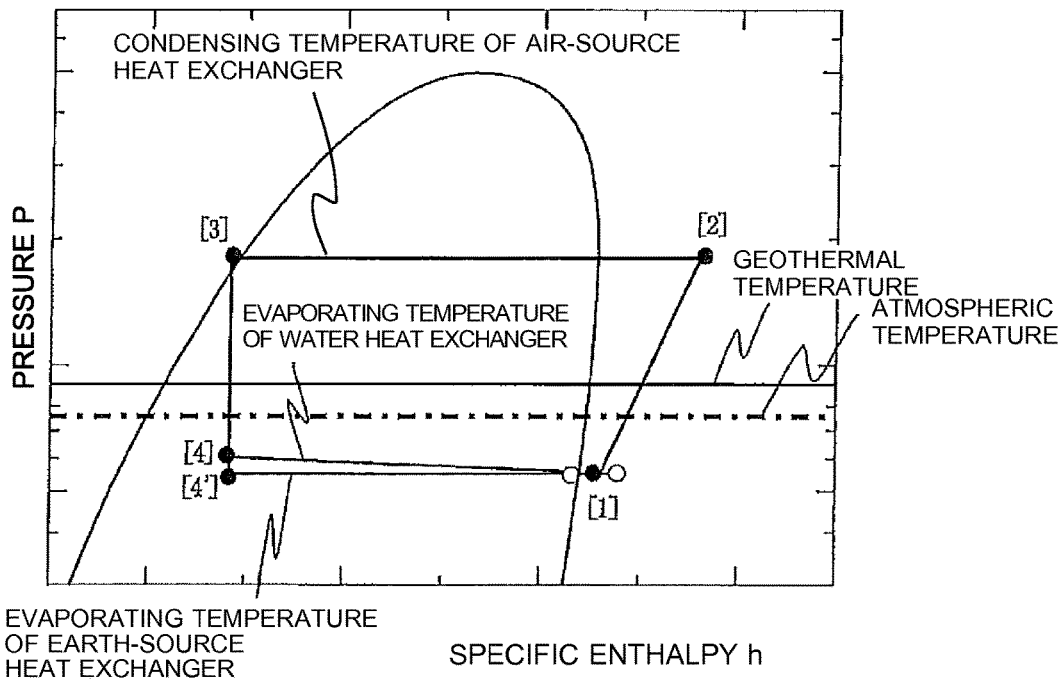
FIG. 7 is a p-h diagram during defrosting operation in FIG. 6.

Next, each operation in the air-conditioning apparatus will be described with reference to FIGS. 2, 4, and 6 showing flow of the refrigerant and FIGS. 3, 5, and 7 which are p-h diagrams (diagrams showing the relationship between the pressure and the specific enthalpy of the refrigerant). Referring to FIGS. 2 and 4, an alternate long and short dashed line indicates a pipe portion through which the refrigerant does not flow. In addition, referring to FIGS. 2, 4, and 6, [i] (i=1, 2, ... ) indicates a refrigerant state at each pipe position shown in FIGS. 3, 5, and 7.

Each operation in the air-conditioning apparatus will be described hereinafter. The heat pump device of the present invention is a device that simultaneously collects heat from both the atmosphere and the underground. In any of the operations to be described below, the geothermal heat pump 22 of the earth-source side circuit 20 operates, and geothermal heat is collected.

(Refrigerant Operation During Normal Operation (Heating Operation))

The operation of the air-conditioning apparatus in normal operation, particularly, in heating operation, according to Embodiment 1 will be described. During heating operation, each of the four-way valve 2 and the three-way valve 6 is switched to a side indicated by a dotted line in FIG. 1.

FIG. 2 is a diagram showing flow of the refrigerant during heating operation in Embodiment 1. FIG. 3 is a diagram showing the relationship between the operation state and the temperature of the heat source side heat medium (the atmospheric temperature and the geothermal temperature) during heating operation in FIG. 2. Note that the geothermal temperature is higher than the air temperature.

The low-temperature and low-pressure refrigerant (state [1]) is compressed by the compressor 1 into a high-temperature and high-pressure refrigerant (state [2]) and discharged from it. The high-temperature and high-pressure refrigerant discharged from the compressor 1 passes through the four-way valve 2 switched for heating, flows into the water heat exchanger 3, and rejects heat to the water in the water circuit 51. The refrigerant (state [3]) obtained as a low-temperature and high-pressure refrigerant due to the heat rejection to the water divides into two streams, which individually flow into the expansion valves 4a and 4b.

The refrigerant having flowed into the expansion valve 4a is reduced in pressure into a refrigerant in state [4], and flows into the air-source heat exchanger 5a. The refrigerant having flowed into the air-source heat exchanger 5a evaporates upon taking away heat from the outdoor air, and then flows out of the air-source heat exchanger 5a. On the other hand, the refrigerant having flowed into the expansion valve 4b is reduced in pressure into a refrigerant in state [4'], and flows into the earth-source heat exchanger 5b. The refrigerant having flowed into the earth-source heat exchanger 5b exchanges heat with the earth-source side medium to take away heat from it. Upon this heat exchange operation, geothermal heat is collected. Then, the refrigerant having evaporated upon the collection of the geothermal heat joins, at a junction and branch point P, the refrigerant having flowed out of the air-source heat exchanger 5a of the main circuit 10a, passes through the four-way valve 2 and the refrigerant container 7a, and is drawn into the compressor 1 by suction again.

(Refrigerant Operation During Normal Operation (Cooling Operation))

Next, the operation of the air-conditioning apparatus in normal operation, particularly, in cooling operation, according to Embodiment 1 will be described. During cooling operation, the four-way valve 2 is switched to a side indicated by a solid line in FIG. 1, and the three-way valve 6 is switched to the side indicated by the dotted line in FIG. 1.

FIG. 4 is a diagram showing flow of the refrigerant during cooling operation in Embodiment 1. FIG. 5 is a diagram showing the relationship between the operation state and the temperature of the heat source side heat medium (the atmospheric temperature and the underground temperature) during cooling operation in FIG. 4. Note that the geothermal temperature is lower than the air temperature.

The low-temperature and low-pressure refrigerant (state [1]) is compressed by the compressor 1 into a high-temperature and high-pressure refrigerant (state [2]) and discharged from it. The high-temperature and high-pressure refrigerant discharged from the compressor 1 passes through the four-way valve 2 switched for cooling and then divides into two streams at the junction and branch point P, one of the two streams flows into the air-source heat exchanger 5a, and the other stream flows into the earth-source heat exchanger 5b via the three-way valve 6.

The refrigerant having flowed into the air-source heat exchanger 5a rejects heat to the atmosphere to become a low-temperature and high-pressure refrigerant (state [3]), flows out of the air-source heat exchanger 5a, and flows into and is decompressed by the expansion valve 4a. On the other hand, the refrigerant having flowed into the earth-source heat exchanger 5b rejects heat to the earth-source side medium to become a low-pressure high-pressure refrigerant (state [3']), flows out of the earth-source heat exchanger 5b, and flows into and is decompressed by the expansion valve 4b. Then, the refrigerant reduced in pressure by the expansion valve 4b joins the refrigerant reduced in pressure by the expansion valve 4a, to become a refrigerant in state [4], and flows into the water heat exchanger 3. The refrigerant having flowed into the water heat exchanger 3 evaporates upon taking away heat from the water in the water circuit 51, passes through the four-way valve 2 and the refrigerant container 7a, and is drawn into the compressor 1 by suction again.

(Refrigerant Operation During Defrosting Operation)

Next, the operation of the air-conditioning apparatus in defrosting operation in Embodiment 1 will be described. During defrosting operation, each of the four-way valve 2 and the three-way valve 6 is switched to the side indicated by the solid line in FIG. 1.

FIG. 6 is a diagram showing flow of the refrigerant during defrosting operation in Embodiment 1. FIG. 7 is a diagram showing the operation state and the temperature of the heat source side heat medium (the atmospheric temperature and the underground temperature) during defrosting operation in FIG. 6. Note that the geothermal temperature is higher than the air temperature.

The low-temperature and low-pressure refrigerant (state [1]) is compressed by the compressor 1 into a high-temperature and high-pressure refrigerant (state [2]) and discharged from it. The high-temperature and high-pressure refrigerant discharged from the compressor 1 passes through the four-way valve 2 switched for defrosting (in the same manner as in cooling) and flows into the air-source heat exchanger 5a. Then, the refrigerant having flowed into the air-source heat exchanger 5a condenses into a low-temperature and high-pressure refrigerant upon rejecting heat to frost adhering on the air-source heat exchanger 5a or the atmosphere, which serves as a heat source side heat medium (state [3]). The thus obtained low-temperature and high-pressure refrigerant flows into the expansion valve 4a and is reduced in pressure into a refrigerant in state [4].

The refrigerant in state [4] divides into two streams, and one of the two streams flows into the water heat exchanger 3, evaporates upon taking away heat from the water in the water circuit 51, and flows out of the water heat exchanger 3. The other stream flows into the expansion valve 4b of the sub-circuit 10b, is further reduced in pressure into a low-temperature and low-pressure refrigerant (state [4']), flows into the earth-source heat exchanger 5b, and exchanges heat with the earth-source side medium to take away heat from it. Upon this heat exchange operation, geothermal heat is collected. Then, the refrigerant in the sub-circuit 10b having evaporated upon the collection of the geothermal heat passes through the three-way valve 6 and flows toward the four-way valve 2. The refrigerant flowing toward the four-way valve 2 joins the refrigerant, on the side of the main circuit 10a, having flowed out of the water heat exchanger 3 and having passed through the four-way valve 2, passes through the refrigerant container 7a, and is drawn into the compressor 1 by suction again.

In this defrosting operation, almost the same cycle as in normal cooling operation is obtained in the main circuit 10a, and a high-temperature refrigerant discharged from the compressor 1 flows into the air-source heat exchanger 5a. Thus, it is possible to melt the frost adhering on the air-source heat exchanger 5a. On the other hand, in the earth-source side circuit 20, the earth-source side medium in the underground heat exchanger 21 exchanges heat with the underground to collect geothermal heat, and the earth-source side medium having collected the geothermal heat exchanges heat with the refrigerant in the sub-circuit 10b, through the underground heat exchanger 21. Thus, the geothermal heat is collected by the refrigerant in the sub-circuit 10b, and the refrigerant stream in the sub-circuit 10b having collected the geothermal heat merges with the refrigerant stream flowing into the main circuit 10a, and the heat is collected into the main circuit 10a. Thus, during defrosting, not only the amount of work of the compressor 1, but also the amount of heat collected from the earth-source heat exchanger 5b can be used as an amount of heat for defrosting.

(Defrosting Operation Control Method)

Figure 8:
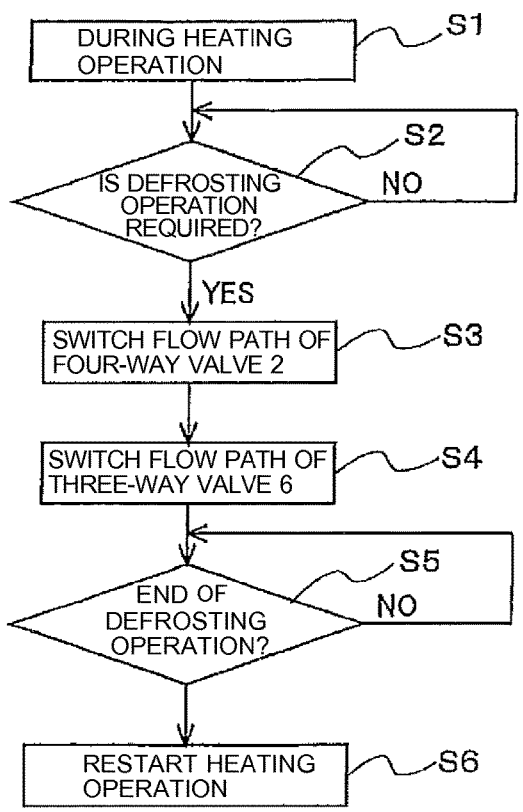
FIG. 8 is a flowchart showing flow of a process during defrosting operation in the air-conditioning apparatus of Embodiment 1 of the present invention.

FIG. 8 is a flowchart showing flow of a process during defrosting operation in the air-conditioning apparatus of Embodiment 1 of the present invention.

During heating operation (S1), the controller 30 of the air-conditioning apparatus determines whether defrosting operation is required, on the basis of a value detected by the sensor or the like (S2). For example, the following methods are available as common examples of determination as to whether defrosting is required. In one method, it is determined that defrosting is required, when the difference between a temperature detected by the refrigerant temperature sensor 31 or a temperature corresponding to the value detected by the suction pressure sensor 34 and an atmospheric temperature detected by the atmospheric temperature sensor 32 becomes a predetermined value. In another method, it is determined that defrosting is required, when the atmospheric temperature is equal to or lower than a predetermined value and the heating operation has been done for a period of time equal to or greater than a predetermined value.

It is determined whether defrosting is required, by such a determination method. If it is determined that defrosting is required, the four-way valve 2 and the three-way valve 6 are switched in a way as shown in FIG. 6, and defrosting operation is started. Specifically, the flow path of the four-way valve 2 is switched in the same way as in cooling operation such that the air-source heat exchanger 5a serves as a condenser (S3). In addition, the three-way valve 6 is switched to the suction side of the compressor 1 (S4) to form a flow path through which the earth-source heat exchanger 5b and the end of the compressor 1 on the suction side communicate with each other. Thus, the earth-source heat exchanger 5b serves as an evaporator.

By switching the four-way valve 2 and the three-way valve 6 in the above-described way, defrosting of the air-source heat exchanger 5a is started, as described above, and the frost adhering on the air-source heat exchanger 5a is melted by the high-temperature and high-pressure refrigerant flowing into the air-source heat exchanger 5a. After the start of defrosting operation, if the controller 30 determines that the frost has been removed (S5), the controller 30 ends defrosting operation. Presence/absence of the frost may be determined on the basis of, for example, whether the condensing temperature is equal to or higher than a predetermined value, or whether a set defrosting operation period of time has elapsed. If the controller 30 determines that the defrosting is to end, the controller 30 switches the flow paths of the three-way valve 6 and the four-way valve 2 and performs heating operation again (S6).

As described above, according to Embodiment 1, during heating operation, both the air-source heat exchanger 5a which exchanges heat with the atmosphere serving as a heat source, and the earth-source heat exchanger 5b which uses geothermal heat as a heat source, serve as evaporators to collect heat from both the atmosphere and another heat source. During defrosting operation, the four-way valve 2 is switched, and the air-source heat exchanger 5a serves as a radiator, while the earth-source heat exchanger 5b serves as an evaporator, and heat collected from the underground by the earth-source side circuit 20 is collected into the main circuit 10a via the sub-circuit 10b. Thus, it is possible to use the geothermal heat as a heat source for defrosting. Therefore, the amount of heat available during defrosting operation increases, and it is possible to reduce the defrosting period of time.

In addition, since a part of the refrigerant having flowed out of the air-source heat exchanger 5a during defrosting operation flows into the earth-source heat exchanger 5b, the flow rate of the refrigerant flowing into the water heat exchanger 3 decreases. Thus, it is possible to keep impairment of comfort during defrosting operation little because the amount of heat taken away from the indoor side through the water heat exchanger 3 is relatively small. In other words, it is possible to suppress a decrease in room temperature during defrosting operation, and to reduce the power input to the compressor upon returning to heating operation. As a result, it is possible to reduce the power consumption.

Regarding the heat pump device 40, the configuration shown in FIG. 1 may be modified as follows. In such a case as well, it is possible to obtain the same advantageous effects as those obtained in the apparatus in FIG. 1.

(Modifications)

Figure 9:
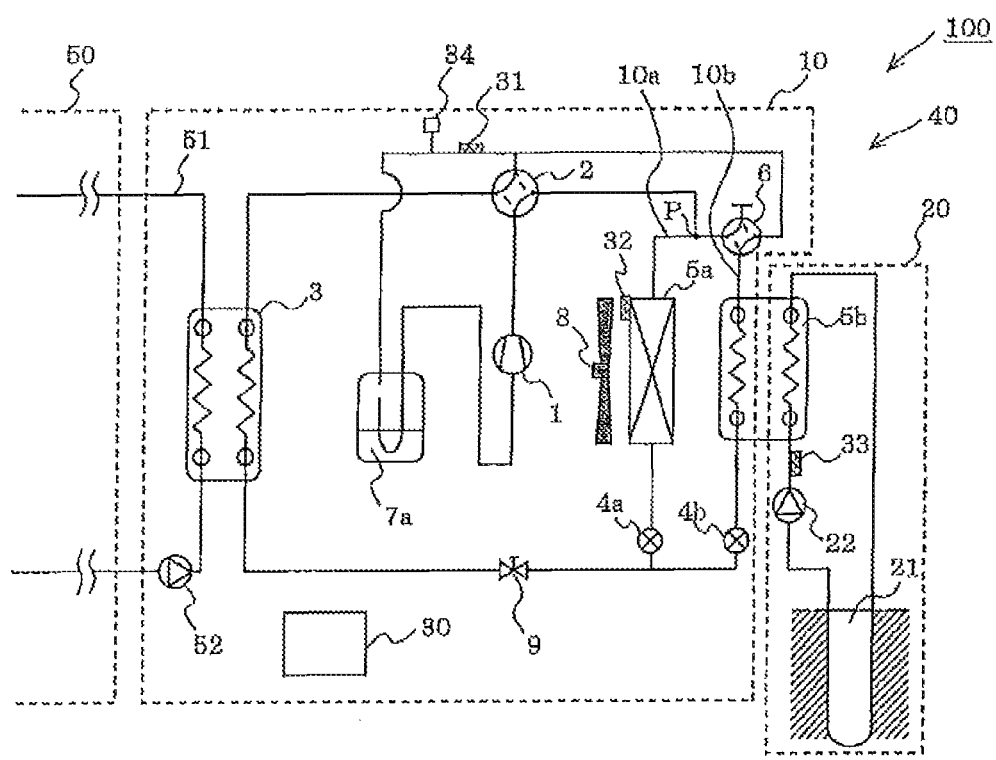
FIG. 9 is a diagram (part 1) showing a modification of Embodiment 1 of the present invention.
Figure 10:
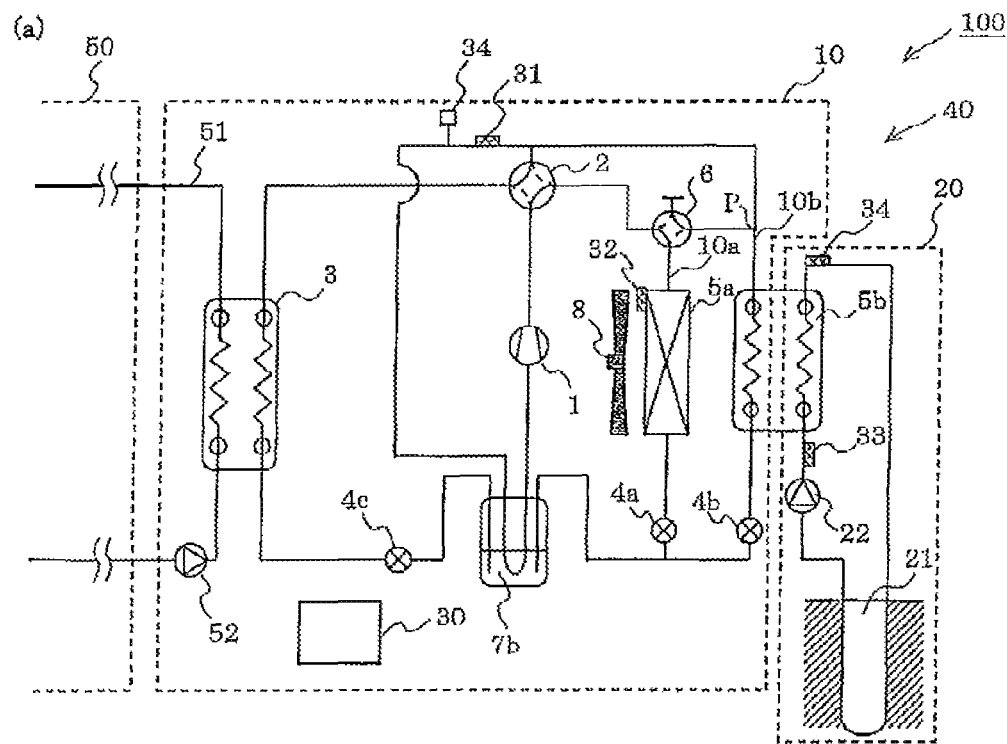
FIG. 10 a diagram (part 2) showing a modification of Embodiment 1 of the present invention.
Figure 10:
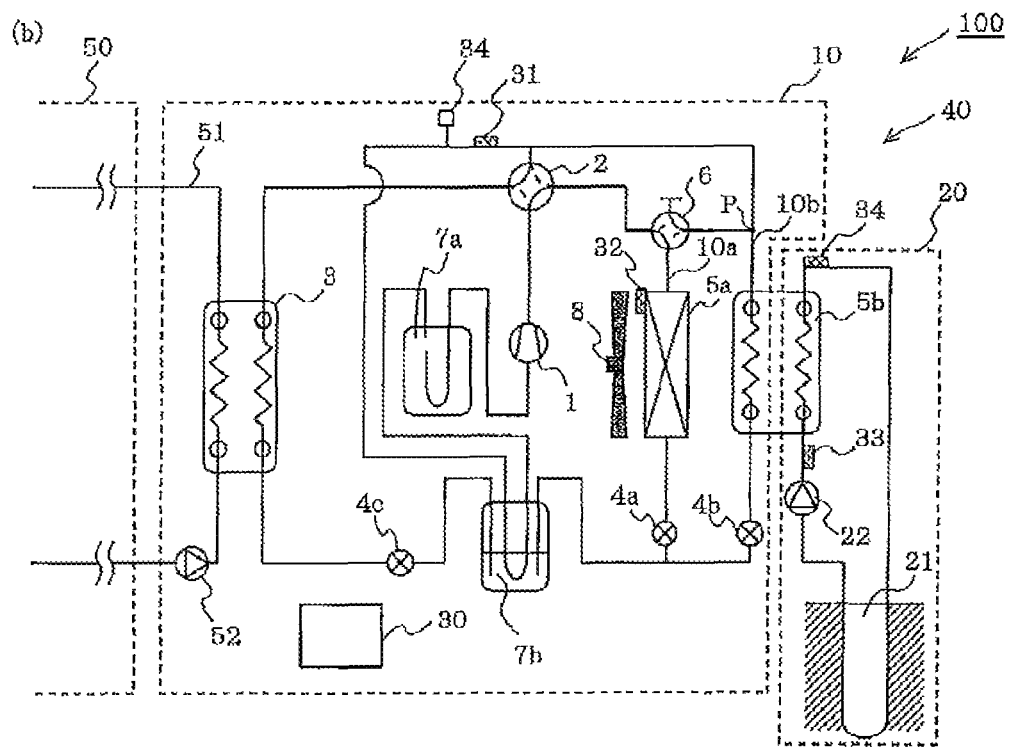

An opening/closing valve 9 may be provided between the water heat exchanger 3 and the expansion valve 4a as shown in FIG. 9, and an expansion valve 4c may be provided at a position that is on the inlet side of the water heat exchanger 3 during defrosting operation, as shown in (a) and (b) of FIG. 10. With such a configuration, during defrosting operation, by closing the opening/closing valve 9 or fully closing the expansion valve 4c, it is possible to remove flow of the refrigerant flowing into the water heat exchanger 3. In this case, the amount of heat taken away from the load side (indoor side) decreases, and thus it is possible to further improve the comfort in the room during defrosting operation. In (a) of FIG. 10, 7b denotes a refrigerant container that stores the refrigerant. In addition to the refrigerant container 7b as shown in (a) of FIG. 10, the refrigerant container 7a which serves as a refrigerant buffer container may be provided.

Embodiment 1 has been described with the four-way valve 2 as an example of the second switching device, but the second switching device is not limited to the four-way valve 2. For example, a plurality of two-way passage switching valves or three-way passage switching valves may be used as the second switching device, and the second switching device may be configured such that flow of the refrigerant is switched in the same manner.

In addition, Embodiment 1 has been described with the three-way valve 6 as an example of the first switching device, but the first switching device is not limited to the three-way valve 6. For example, a plurality of two-way passage switching valves may be used as the first switching device, or one flow path of a four-way valve may be closed, whereby the first switching device may be configured that the flow of the refrigerant is switched in the same manner.

Embodiment 2

Embodiment 2 is intended to reduce the amount of work of a compressor during defrosting operation.

Figure 11:
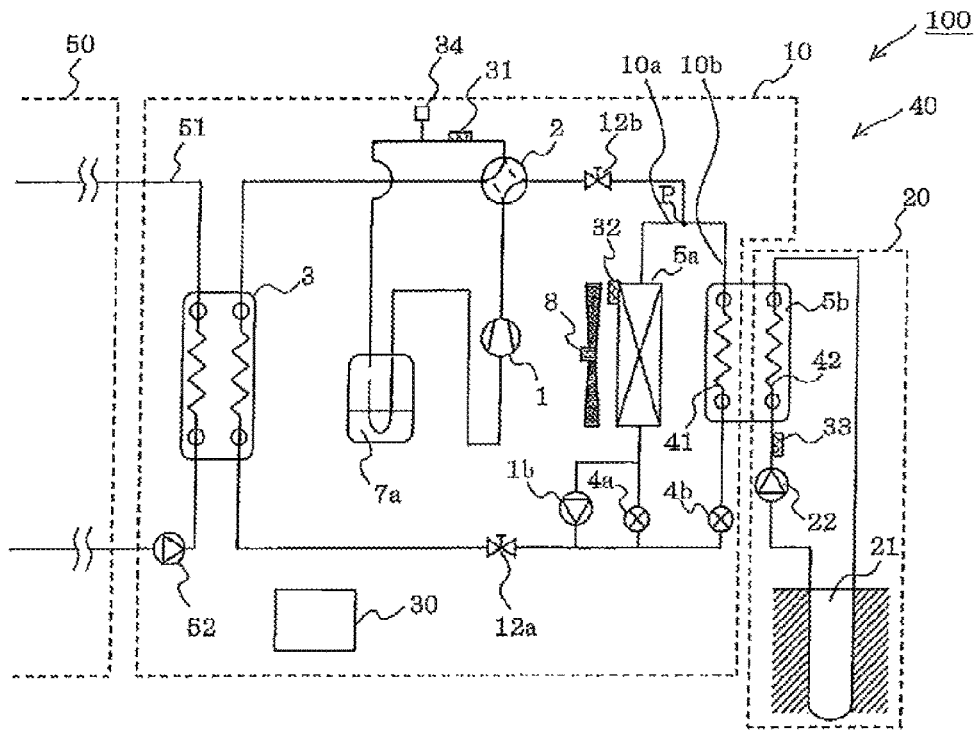
FIG. 11 is a diagram showing a refrigerant circuit of an air-conditioning system including a heat pump device of Embodiment 2 of the present invention.

FIG. 11 is a diagram showing a refrigerant circuit of an air-conditioning system including a heat pump device of Embodiment 2 of the present invention. In FIG. 11, the same portions as those in FIG. 1 are designated by the same reference signs. The same applies to the embodiments to be described later. In addition, the modifications applied to the same component portions as those in Embodiment 1 are similarly applied to Embodiment 2. The same also applies to the embodiments to be described later.

In addition to Embodiment 1 shown in FIG. 1, the heat pump device of Embodiment 2 shown in FIG. 11 includes a refrigerant pump 1b provided in parallel with the expansion valve 4a, and opening/closing valves 12a and 12b for blocking a part of the flow path of the refrigerant circuit 10, specifically, a flow path of the four-way valve 2→the refrigerant container 7a→the compressor 1→the water heat exchanger 3, during defrosting operation, to separate the flow path from another flow path. In addition, in the heat pump device 40 of Embodiment 2, the three-way valve 6 in Embodiment 1 shown in FIG. 1 is omitted. The refrigerant pump 1b is operated during defrosting operation and is stopped during normal operation. In the heat pump device 40 of Embodiment 2, during defrosting operation, the compressor 1 is stopped, and the refrigerant pump 1b is operated to circulate the refrigerant through a later-described defrosting circuit A to perform defrosting of the air-source heat exchanger 5a.

(Refrigerant Operation During Normal Operation (Heating Operation))

The operation of the air-conditioning apparatus in normal operation, particularly, in heating operation, according to Embodiment 2 will be described. During heating operation, the four-way valve 2 is switched to a side indicated by a dotted line in FIG. 11.

Figure 12:
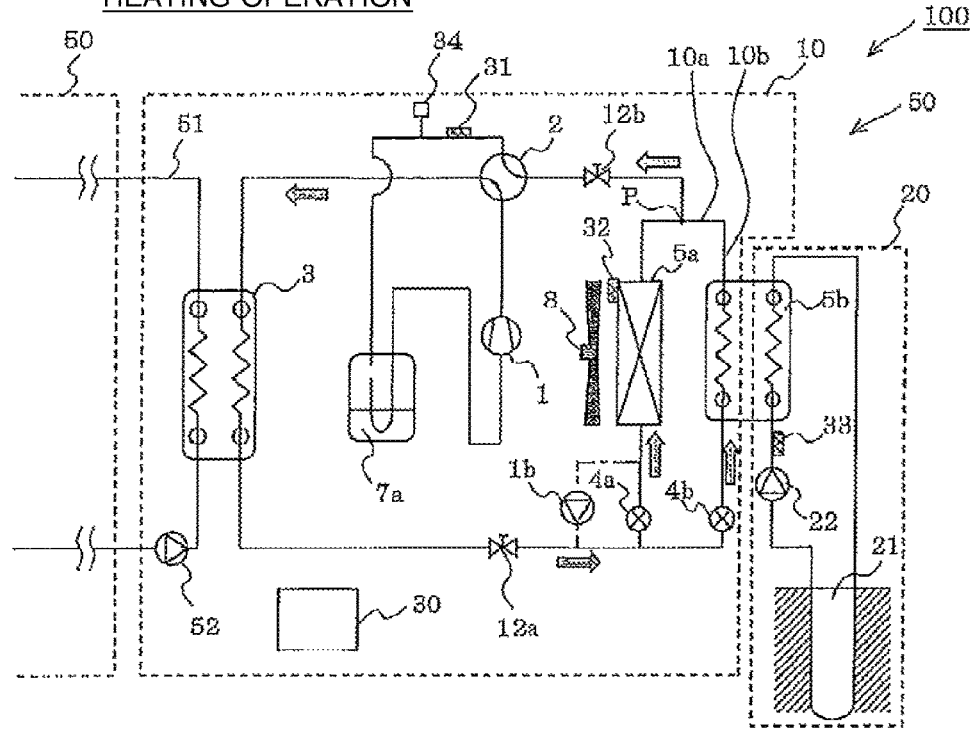
FIG. 12 is a diagram showing flow of a refrigerant during heating operation in Embodiment 2.

FIG. 12 is a diagram showing flow of the refrigerant during heating operation in Embodiment 2. Referring to FIG. 12, an alternate long and short dashed line indicates a pipe portion through which the refrigerant does not flow. In addition, the refrigerant pump 1b is stopped, and the opening/closing valves 12a and 12b are opened.

The low-temperature and low-pressure refrigerant is compressed by the compressor 1 into a high-temperature and high-pressure refrigerant and discharged from it. The high-temperature and high-pressure refrigerant discharged from the compressor 1 passes through the four-way valve 2 switched for heating, flows into the water heat exchanger 3, and rejects heat to the water in the water circuit 51. The low-temperature and high-pressure refrigerant obtained due to the heat rejection to the water divides into two streams, which individually flow into the expansion valves 4a and 4b.

The refrigerant having flowed into the expansion valve 4a is reduced in pressure, flows into the air-source heat exchanger 5a, evaporates upon taking away heat from the outdoor air into a low-pressure refrigerant, and flows out of the air-source heat exchanger 5a. On the other hand, the refrigerant having flowed into the expansion valve 4b is reduced in pressure, flows into the earth-source heat exchanger 5b, and exchanges heat with the earth-source side medium to take away heat from it. Upon this heat exchange operation, geothermal heat is collected. Then, the refrigerant having evaporated upon the collection of the geothermal heat joins, at the junction and branch point P, the refrigerant having flowed out of the air-source heat exchanger 5a of the main circuit 10a, passes through the four-way valve 2 and the refrigerant container 7a, and is drawn into the compressor 1 by suction again.

(Refrigerant Operation During Defrosting Operation)

Next, the operation of the air-conditioning apparatus in defrosting operation in Embodiment 2 will be described.

Figure 13:
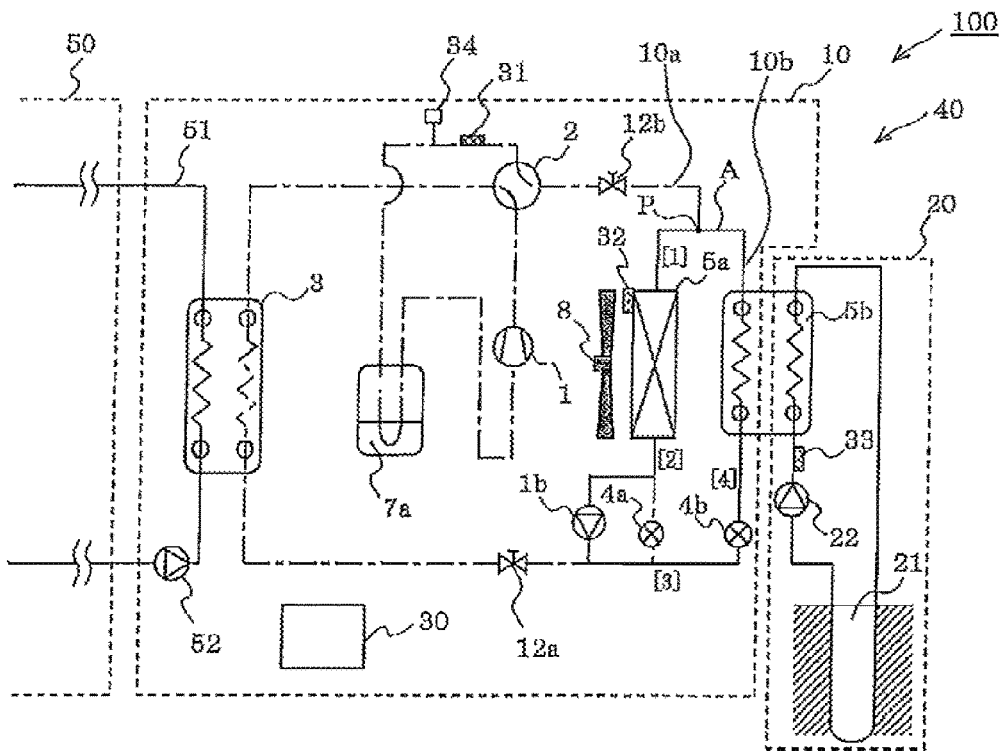
FIG. 13 is a diagram showing flow of the refrigerant during defrosting operation in Embodiment 2.
Figure 14:
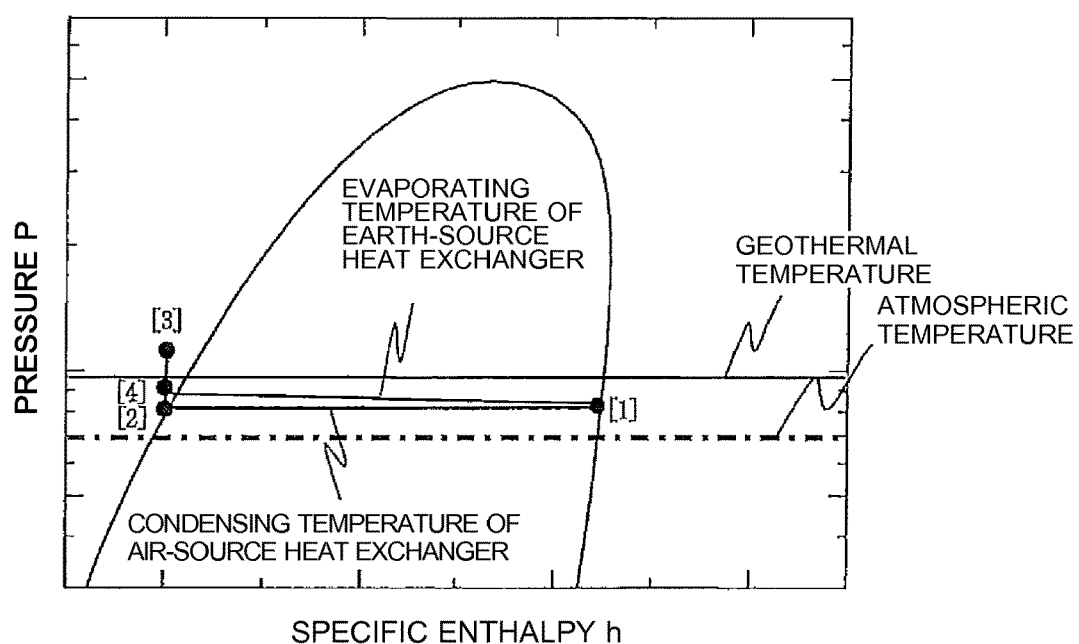
FIG. 14 is a p-h diagram during defrosting operation in FIG. 13.

FIG. 13 is a diagram showing flow of the refrigerant during defrosting operation in Embodiment 2. Referring to FIG. 13, an alternate long and short dashed line indicates a pipe portion through which the refrigerant does not flow. FIG. 14 shows a p-h diagram (a diagram showing the relationship between the pressure and the specific enthalpy of the refrigerant) and is a diagram showing the relationship between the operation state and the temperature of the heat source side heat medium (the atmospheric temperature and the underground temperature) during defrosting operation in FIG. 13. Note that the geothermal temperature is higher than the air temperature. In addition, referring to FIG. 14, [i] (i=1, 2, . . . ) indicates a refrigerant state at each pipe position shown by [i] (i=1, 2, . . . ) in FIG. 13.

In Embodiment 2, during defrosting operation, while the compressor 1 is stopped, the refrigerant pump 1b is operated, the opening/closing valves 12a and 12b are closed, and the expansion valve 4a is also closed. By so doing, a defrosting circuit A is formed in which the refrigerant in the air-source heat exchanger 5a circulates in order of the refrigerant pump 1b→the expansion valve 4b→the earth-source heat exchanger 5b→the air-source heat exchanger 5a, the air-source heat exchanger 5a serves as a condenser, and the earth-source heat exchanger 5b serves as an evaporator.

In such a defrosting circuit A, the refrigerant in state [1] flows into the air-source heat exchanger 5a, condenses into a low-temperature refrigerant (state [2]) upon rejecting heat to frost adhering on the air-source heat exchanger 5a or the atmosphere, and flows out of the air-source heat exchanger 5a. The refrigerant having flowed out of the air-source heat exchanger 5a is increased in pressure by the refrigerant pump 1b into a refrigerant in state [3], and is subsequently reduced in pressure by the expansion valve 4b into a refrigerant in state [4]. Then, the refrigerant in state [4] flows into the earth-source heat exchanger 5b and exchanges heat with the earth-source side medium to take away heat from it. Upon this heat exchange operation, geothermal heat is collected. Then, the refrigerant having evaporated upon the collection of the geothermal heat flows into the air-source heat exchanger 5a and rejects heat to the frost adhering on the air-source heat exchanger 5a or the atmosphere as described above. Thus, the frost adhering on the air-source heat exchanger 5a is melted.

When the refrigerant circulates through the defrosting circuit A as described above, it is possible to use an amount of heat collected from the earth-source heat exchanger 5b as an amount of heat for defrosting of the air-source heat exchanger 5a. In the case of this cycle, since the condensing temperature of the air-source heat exchanger is lower than the evaporating temperature of the earth-source heat exchanger, in a state where the geothermal temperature is higher than the air temperature by at least 0 degrees C., the condensing temperature of the air-source heat exchanger is equal to or higher than 0 degrees C., and it is possible to melt the frost.

Next, control action in defrosting operation in Embodiment 2 will be described. Note that particularly, actuator action different from that in Embodiment 1 will be described.

When the controller 30 determines that defrosting is required during heating operation, the controller 30 stops the compressor 1 and closes the opening/closing valves 12a and 12b. Then, the controller 30 operates the refrigerant pump 1b and circulates the refrigerant through the defrosting circuit A. By so doing, defrosting of the air-source heat exchanger 5a is performed with the geothermal heat collected by the earth-source heat exchanger 5b as described above. Then, when the controller 30 determines that the defrosting operation is to end, the controller 30 stops the refrigerant pump 1b, opens the opening/closing valves 12a and 12b, operates the compressor 1, and performs heating operation again.

As described above, according to Embodiment 2, during heating operation, both the air-source heat exchanger 5a, which exchanges heat with the atmosphere as a heat source, and the earth-source heat exchanger 5b, which uses geothermal heat as a heat source, serve as evaporators to collect heat from both the atmosphere and another heat source. During defrosting operation, the compressor 1 is stopped, and it is possible to perform defrosting with the refrigerant pump 1b as a power source. Thus, it is possible to reduce the amount of work of the compressor during defrosting operation. Therefore, it is possible to reduce the power consumption during defrosting operation. In addition, the flow rate of the refrigerant flowing into the water heat exchanger 3 is reduced by stopping the compressor 1, and thus it is possible to restrain the comfort from being impaired during defrosting operation.

Figure 15:
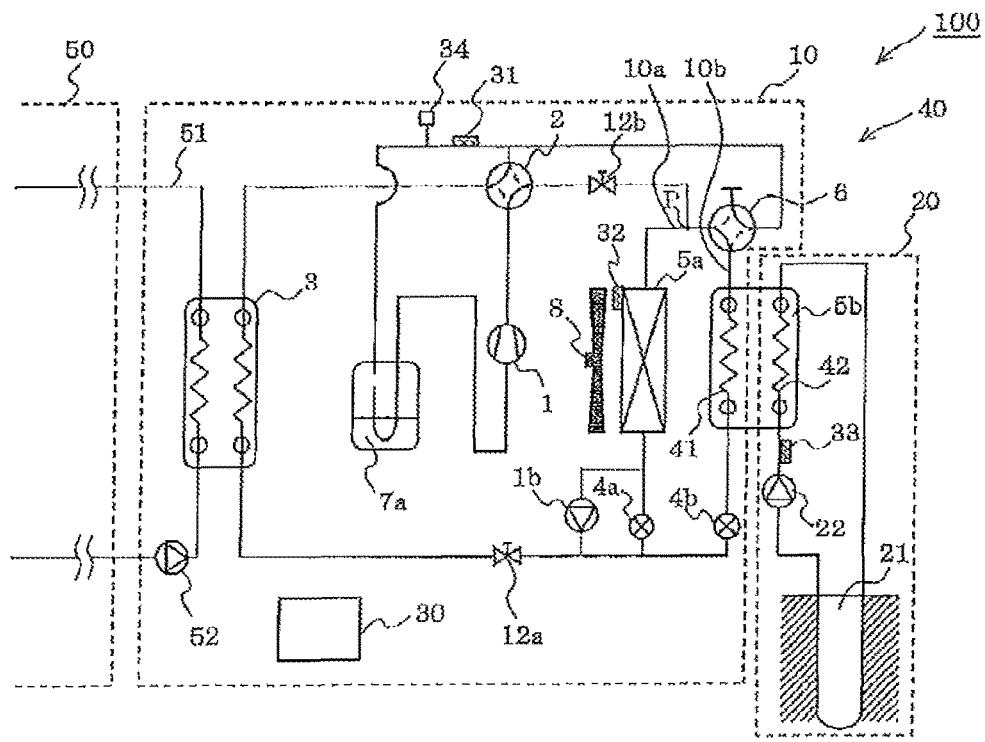
FIG. 15 is a diagram showing a modification of the refrigerant circuit of the air-conditioning system including the heat pump device of Embodiment 2 of the present invention.

In Embodiment 2, the three-way valve 6 is omitted from the configuration in Embodiment 1 shown in FIG. 1, but the three-way valve 6 may be provided as shown in FIG. 15, similarly to Embodiment 1. In the case of the configuration in which the three-way valve 6 is provided, it is possible to appropriately select either a method of performing defrosting with the defrosting circuit A and a method of performing defrosting in a reverse mode and perform defrosting. As a condition for appropriate selection and defrosting, for example, the reverse mode is used in which it is possible to collect heat from a room whose temperature is higher than that of the outdoor air or underground is used in the case where it is desired to complete defrosting quickly, and defrosting with natural circulation or a refrigerant pump is performed in the case where it is desired to reduce the power consumption as much as possible.

In addition, in Embodiment 2, the refrigerant pump 1b is provided in parallel with the expansion valve 4a in consideration of pressure loss during normal operation, but the refrigerant pump 1b only needs to be provided such that the refrigerant is allowed to circulate between the air-source heat exchanger 5a and the earth-source heat exchanger 5b.

In the case where the air-source heat exchanger 5a is disposed at a position higher than the earth-source heat exchanger 5b, the refrigerant undergoes natural circulation through the defrosting circuit A due to a temperature difference being generated between the air-source heat exchanger 5a and the earth-source heat exchanger 5b. Thus, in this case, the refrigerant pump 1b is unnecessary, and it is possible to further reduce the power consumption during defrosting operation.

Embodiment 3

In Embodiment 1, during defrosting operation, heating operation is stopped and the main circuit 10a is used for cooling operation. However, in Embodiment 3, during defrosting operation, defrosting is allowed to be also performed while heating operation is continued.

Figure 16:
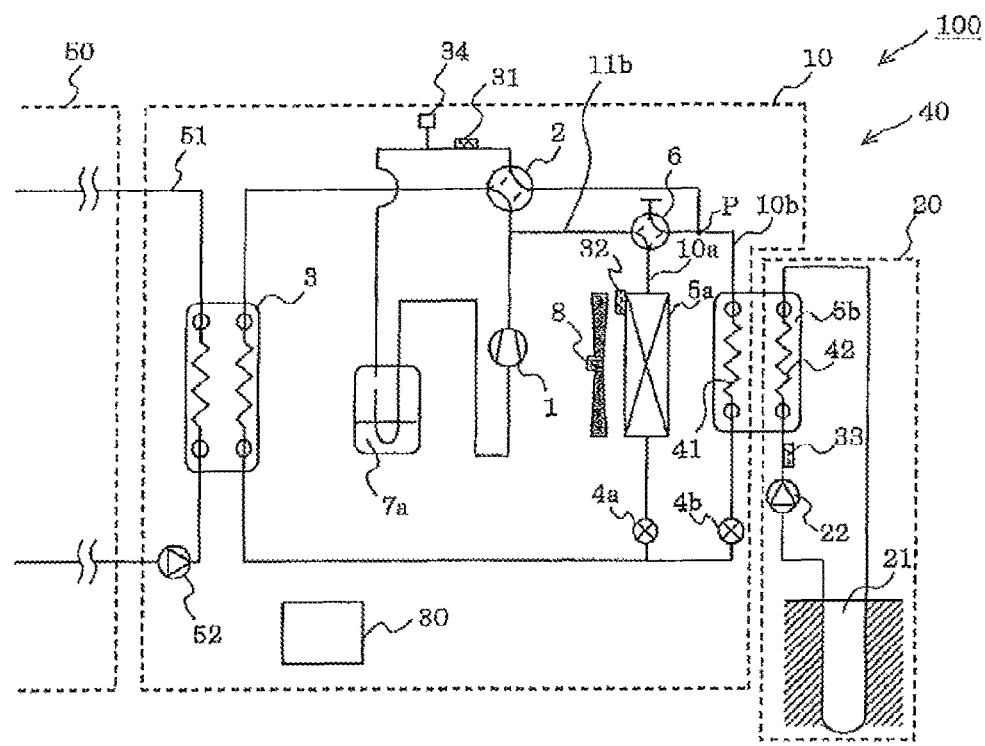
FIG. 16 is a diagram showing a refrigerant circuit of an air-conditioning system including a heat pump device of Embodiment 3 of the present invention.

FIG. 16 is a diagram showing a refrigerant circuit of an air-conditioning system including a heat pump device of Embodiment 3 of the present invention.

The heat pump device 40 of Embodiment 3 is different from that of Embodiment 1 in the position of the three-way valve 6. Specifically, in Embodiment 3, in the main circuit 10a, the three-way valve 6 is provided on a branch pipe 11b branching from a pipe defined between the compressor 1 and the four-way valve 2, and the end of the air-source heat exchanger 5a on its side opposite to the expansion valve 4a is switched by the three-way valve 6 so as to be connected to the earth-source heat exchanger 5b (the end of the earth-source heat exchanger 5b on its side opposite to the expansion valve 4b) or the discharge side of the compressor 1.

(Refrigerant Operation During Normal Operation (Heating Operation))

The operation of the air-conditioning apparatus in normal operation, particularly, in heating operation, according to Embodiment 3 will be described. During heating operation, the four-way valve 2 is switched to a side indicated by a solid line in FIG. 16, and the three-way valve 6 is switched to a side indicated by a dotted line in FIG. 16.

Figure 17:
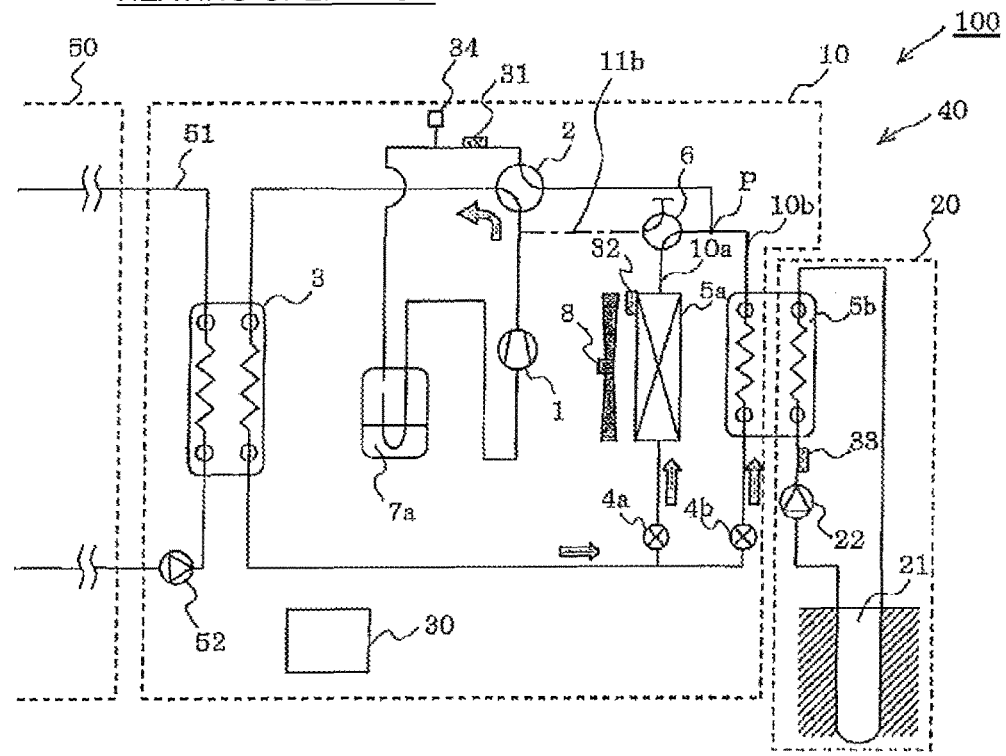
FIG. 17 is a diagram showing flow of a refrigerant during heating operation in Embodiment 3.

FIG. 17 is a diagram showing flow of the refrigerant during heating operation in Embodiment 3. Referring to FIG. 1, an alternate long and short dashed line indicates a pipe portion through which the refrigerant does not flow.

The low-temperature and low-pressure refrigerant is compressed by the compressor 1 into a high-temperature and high-pressure refrigerant and discharged from it. The high-temperature and high-pressure refrigerant discharged from the compressor 1 passes through the four-way valve 2 switched for heating, flows into the water heat exchanger 3, and rejects heat to the water in the water circuit 51. The low-temperature and high-pressure refrigerant obtained due to the heat rejection to the water divides into two streams, which individually flow into the expansion valves 4a and 4b.

The refrigerant having flowed into the expansion valve 4a is reduced in pressure, flows into the air-source heat exchanger 5a, evaporates upon taking away heat from the outdoor air into a low-pressure refrigerant, flows out of the air-source heat exchanger 5a, and passes through the three-way valve 6. On the other hand, the refrigerant having flowed into the expansion valve 4b is reduced in pressure, flows into the earth-source heat exchanger 5b, and exchanges heat with the earth-source side medium to take away heat from it. Upon this heat exchange operation, geothermal heat is collected. Then, the refrigerant having evaporated upon the collection of the geothermal heat joins, at the junction and branch point P, the refrigerant having flowed out of the air-source heat exchanger 5a of the main circuit 10a and having passed through the three-way valve 6, passes through the four-way valve 2 and the refrigerant container 7a, and is drawn into the compressor 1 by suction again.

(Refrigerant Operation During Defrosting Operation)

Next, the operation of the air-conditioning apparatus in defrosting operation in Embodiment 3 will be described. During defrosting operation, each of the four-way valve 2 and the three-way valve 6 is switched to the side indicated by the solid line in FIG. 16.

Figure 18:
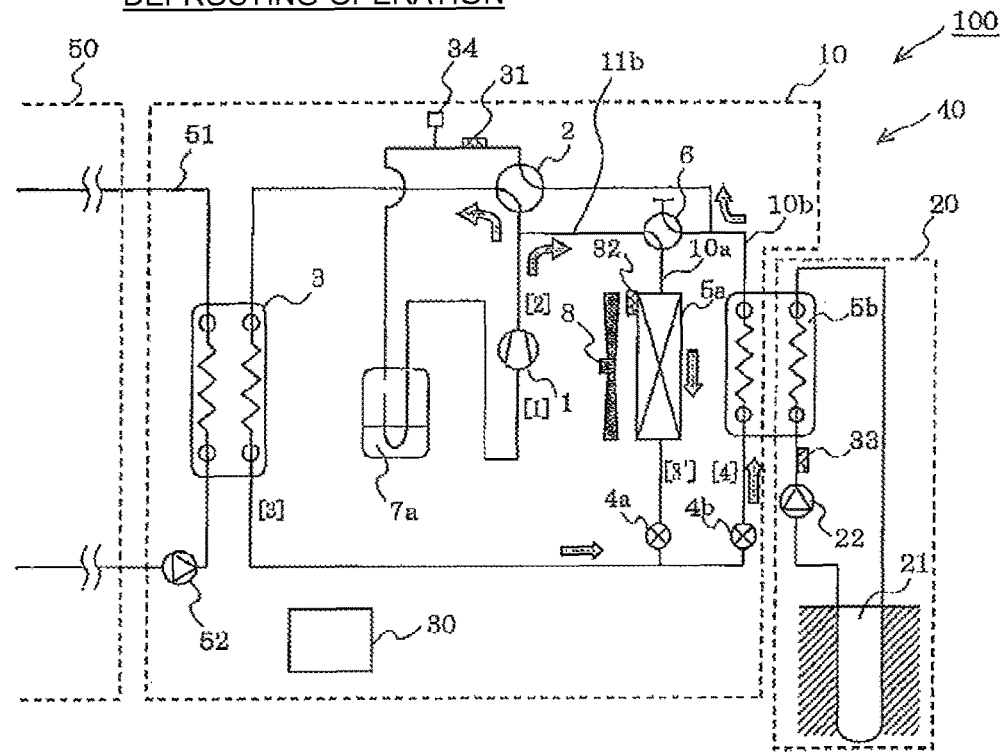
FIG. 18 is a diagram showing flow of the refrigerant during defrosting operation in Embodiment 3.
Figure 19:
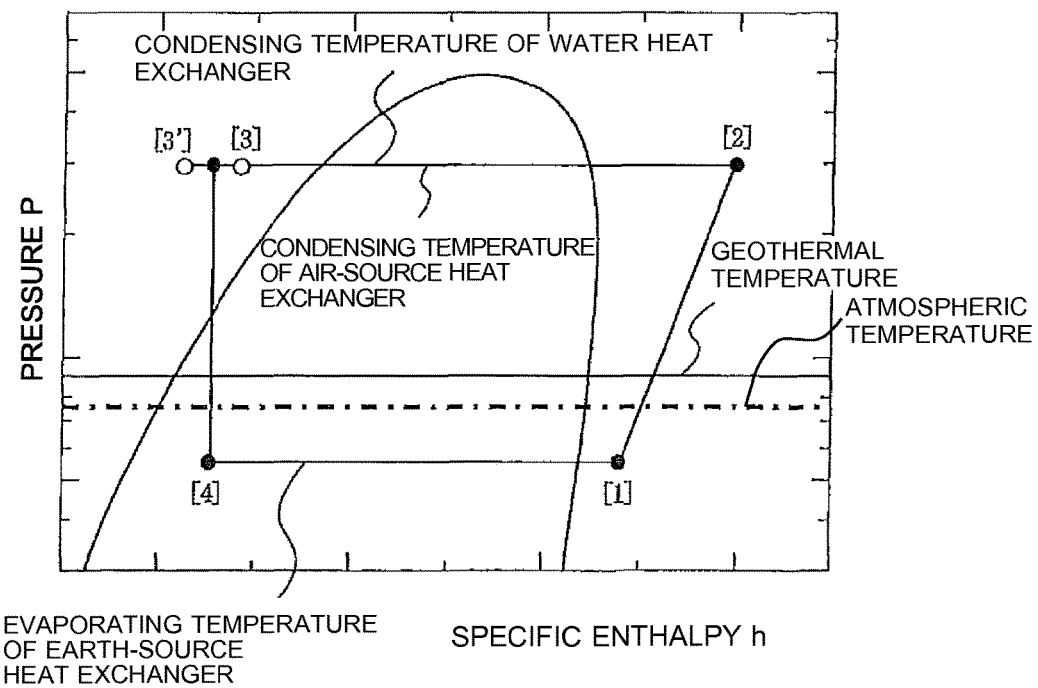
FIG. 19 is a p-h diagram during defrosting operation in FIG. 18.

FIG. 18 is a diagram showing flow of the refrigerant during defrosting operation in Embodiment 3. FIG. 19 shows a p-h diagram (a diagram showing the relationship between the pressure and the specific enthalpy of the refrigerant) and is a diagram showing the relationship between the operation state and the temperature of the heat source side heat medium (the atmospheric temperature and the underground temperature) during defrosting operation in FIG. 18. Note that the geothermal temperature is higher than the air temperature. In addition, referring to FIG. 19, [i] (i=1, 2, . . . ) indicates a refrigerant state at each pipe position shown by [i] (i=1, 2, . . . ) in FIG. 18.

The low-temperature and low-pressure refrigerant (state [1]) is compressed by the compressor 1 into a high-temperature and high-pressure refrigerant (state [2]) and discharged from it. The high-temperature and high-pressure refrigerant discharged from the compressor 1 is divided into two streams, and one of the two streams passes through the four-way valve 2 switched for defrosting (in the same manner as in heating) and flows into the water heat exchanger 3. Then, the refrigerant having flowed into the water heat exchanger 3 rejects heat to the water in the water circuit 51 to become a low-temperature and high-pressure refrigerant (state [3]) and flows out of the water heat exchanger 3. The other stream flows into the air-source heat exchanger 5a. Since a part of the high-temperature and high-pressure refrigerant discharged from the compressor 1 flows into the air-source heat exchanger 5a as described above, it is possible to melt frost adhering on the air-source heat exchanger 5a. Then, the refrigerant having flowed into the air-source heat exchanger 5a rejects heat to the frost adhering on the air-source heat exchanger 5a and the atmosphere to become a low-temperature and high-pressure refrigerant (state [3']), and then passes through the expansion valve 4a. It should be noted that the expansion valve 4a is fully opened or is in a state close to full open, and the refrigerant pass therethrough without being reduced in pressure.

The refrigerant having passed through the expansion valve 4a joins the refrigerant having flowed out of the water heat exchanger 3, flows into the expansion valve 4b of the sub-circuit 10b, and is reduced in pressure into a refrigerant in state [4]. The refrigerant in state [4] flows into the earth-source heat exchanger 5b and exchanges heat with the earth-source side medium to take away heat from it. Upon this heat exchange operation, geothermal heat is collected. Then, the refrigerant having evaporated upon the collection of the geothermal heat flows into the four-way valve 2, passes through the refrigerant container 7a, and is drawn into the compressor 1 by suction again.

In this defrosting operation, heating operation is continuously performed in the main circuit 10a even during defrosting operation. Thus, it is possible to perform defrosting of the air-source heat exchanger 5a while the comfort in a room is maintained. In addition, in the earth-source side circuit 20, geothermal heat is collected by the underground heat exchanger 21 and transmitted to the main circuit 10a through the sub-circuit 10b. Thus, during defrosting, in addition to the amount of work of the compressor 1, it is possible to use the amount of heat collected from the earth-source heat exchanger 5b, as an amount of heat for defrosting and also as an amount of heat for heating.

Next, control action in defrosting operation in Embodiment 3 will be described. Note that particularly, actuator action different from that in Embodiment 1 will be described.

When the controller 30 determines that defrosting is required during heating operation, the controller 30 does not switch the flow path of the four-way valve 2 and keeps the flow path for heating, and switches the flow path of the three-way valve 6 to the discharge side of the compressor 1 such that the refrigerant discharged from the compressor 1 flows into the air-source heat exchanger 5a. By so doing, the refrigerant discharged from the compressor 1 flows into the water heat exchanger 3 and the air-source heat exchanger 5a, each of the water heat exchanger 3 and the air-source heat exchanger 5a serves as a condenser, and the earth-source heat exchanger 5b serves as an evaporator. Then, when the controller 30 determines that the defrosting operation is to end, the controller 30 switches the flow path of the three-way valve 6 to the side of the earth-source heat exchanger 5b and performs heating operation again.

As described above, according to Embodiment 3, during heating operation, both the air-source heat exchanger 5a, which exchanges heat with the atmosphere as a heat source, and the earth-source heat exchanger 5b, which uses geothermal heat as a heat source, serve as evaporators to collect heat from both the atmosphere and another heat source. During defrosting operation, the earth-source heat exchanger 5b serves as an evaporator to collect geothermal heat, thus the amount of heat that can be used during defrosting operation increases, and it is possible to shorten the defrosting period of time.

In addition, since a part of the refrigerant discharged from the compressor 1 flows into the water heat exchanger 3, heating operation is enabled even during defrosting operation, and it is possible to restrain the comfort from being impaired during defrosting operation. Thus, it is possible to suppress a decrease in room temperature during defrosting operation, and it is possible to reduce the power input to the compressor upon returning to heating operation. As a result, it is possible to reduce the power consumption.

Moreover, according to Embodiment 3, it is possible to use the amount of work of the compressor 1 and the amount of heat collected from the earth-source heat exchanger 5b, as an amount of heat for defrosting of the air-source heat exchanger 5a and also as an amount of heat for heating.

Embodiment 4

Figure 20:
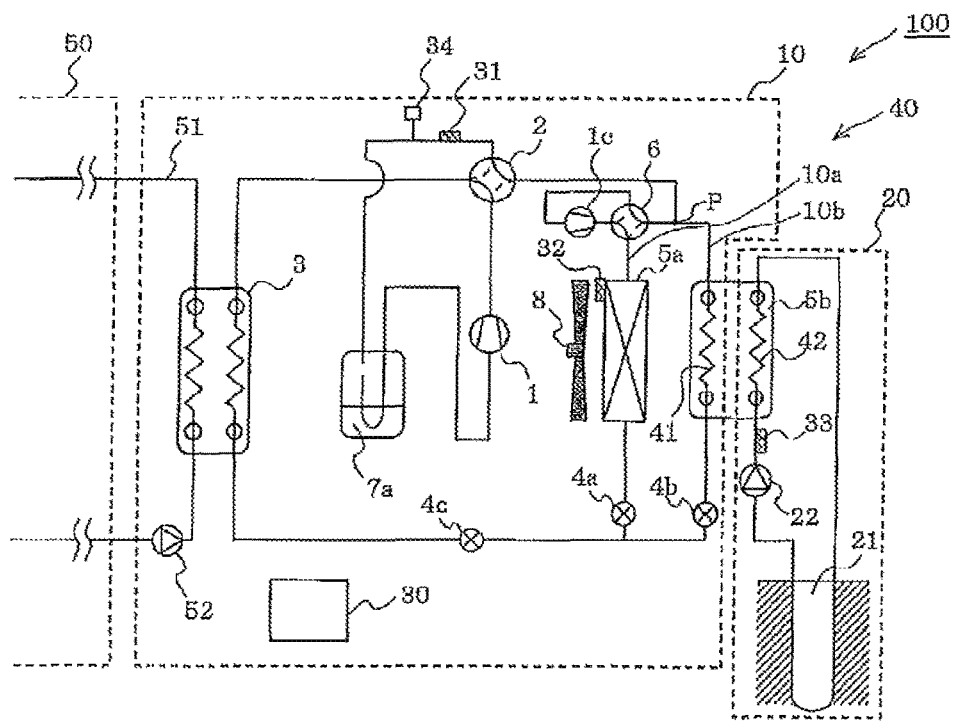
FIG. 20 is a diagram showing a refrigerant circuit of an air-conditioning system including a heat pump device of Embodiment 4 of the present invention.

FIG. 20 is a diagram showing a refrigerant circuit of an air-conditioning system including a heat pump device of Embodiment 4 of the present invention. The heat pump device 40 of Embodiment 4 has a configuration in which, in the heat pump device 40 of Embodiment 3 shown in FIG. 16, the branch pipe 11b is omitted but an auxiliary compressor 1c is newly added to the main circuit 10a. In addition, in the heat pump device 40 of Embodiment 4, the air-source heat exchanger 5a communicates with the discharge side of the auxiliary compressor 1c or the side of the earth-source heat exchanger 5b (the side of the refrigerant flow path 41 of the earth-source heat exchanger 5b opposite to the expansion valve 4b) by switching of the three-way valve 6. Moreover, an expansion valve 4c is provided between the water heat exchanger 3 and the expansion valves 4a and 4b to allow the flow rate of the refrigerant flowing into the water heat exchanger 3 to be controlled.

(Refrigerant Operation During Normal Operation (Heating Operation))

The operation of the air-conditioning apparatus in normal operation, particularly, in heating operation, according to Embodiment 4 will be described. During heating operation, the four-way valve 2 is switched to a side indicated by a sold line in FIG. 20, and the three-way valve 6 is switched to a side indicated by a dotted line in FIG. 20.

Figure 21:
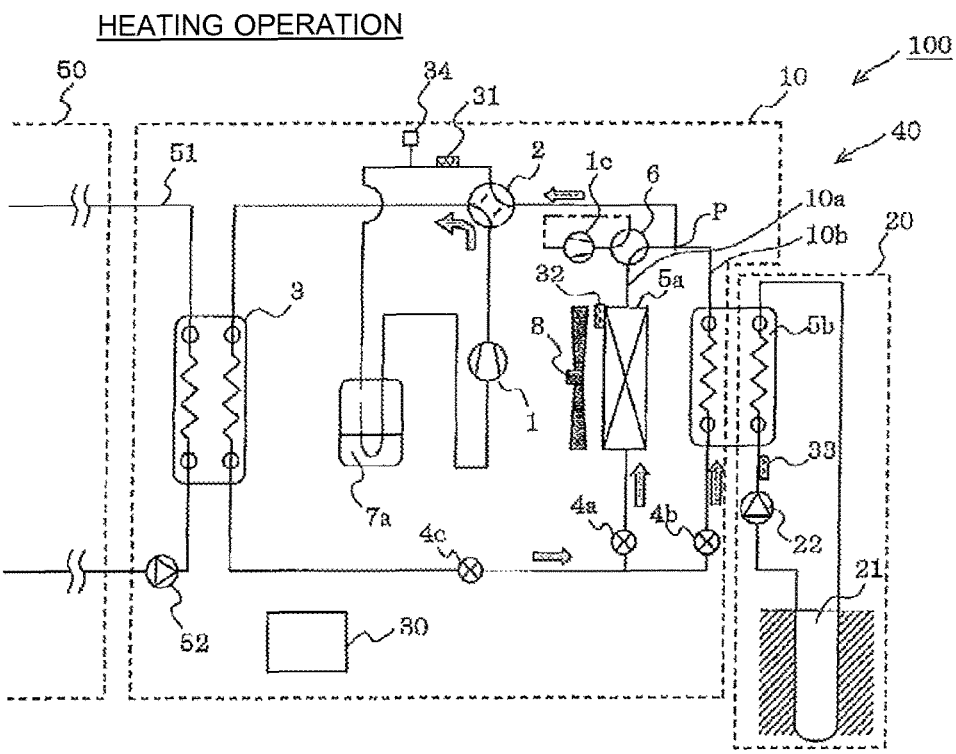
FIG. 21 is a diagram showing flow of a refrigerant during heating operation in Embodiment 4.

FIG. 21 is a diagram showing flow of the refrigerant during heating operation in Embodiment 4. Referring to FIG. 21, an alternate long and short dashed line indicates a pipe portion through which the refrigerant does not flow. In addition, operation of the auxiliary compressor 1c is stopped, and the expansion valve 4c is fully opened.

The low-temperature and low-pressure refrigerant is compressed by the compressor 1 into a high-temperature and high-pressure refrigerant and discharged from it. The high-temperature and high-pressure refrigerant discharged from the compressor 1 passes through the four-way valve 2 switched for heating, flows into the water heat exchanger 3, and rejects heat to the water in the water circuit 51. The low-temperature and high-pressure refrigerant obtained due to the heat rejection to the water divides into two streams, which individually flow into the expansion valves 4a and 4b.

The refrigerant having flowed into the expansion valve 4a is reduced in pressure, flows into the air-source heat exchanger 5a, evaporates upon taking away heat from the outdoor air into a low-pressure refrigerant, flows out of the air-source heat exchanger 5a, and passes through the three-way valve 6. On the other hand, the refrigerant having flowed into the expansion valve 4b is reduced in pressure, flows into the earth-source heat exchanger 5b, and exchanges heat with the earth-source side medium to take away heat from it. Upon this heat exchange operation, geothermal heat is collected. Then, the refrigerant having evaporated upon the collection of the geothermal heat joins, at the junction and branch point P, the refrigerant having flowed out of the air-source heat exchanger 5a of the main circuit 10a and having passed through the three-way valve 6, passes through the four-way valve 2 and the refrigerant container 7a, and is drawn into the compressor 1 by suction again.

(Refrigerant Operation During Defrosting Operation)

Next, the operation of the air-conditioning apparatus in defrosting operation in Embodiment 4 will be described. During defrosting operation, each of the four-way valve 2 and the three-way valve 6 is switched to a side indicated by a solid line in FIG. 20.

Figure 22:
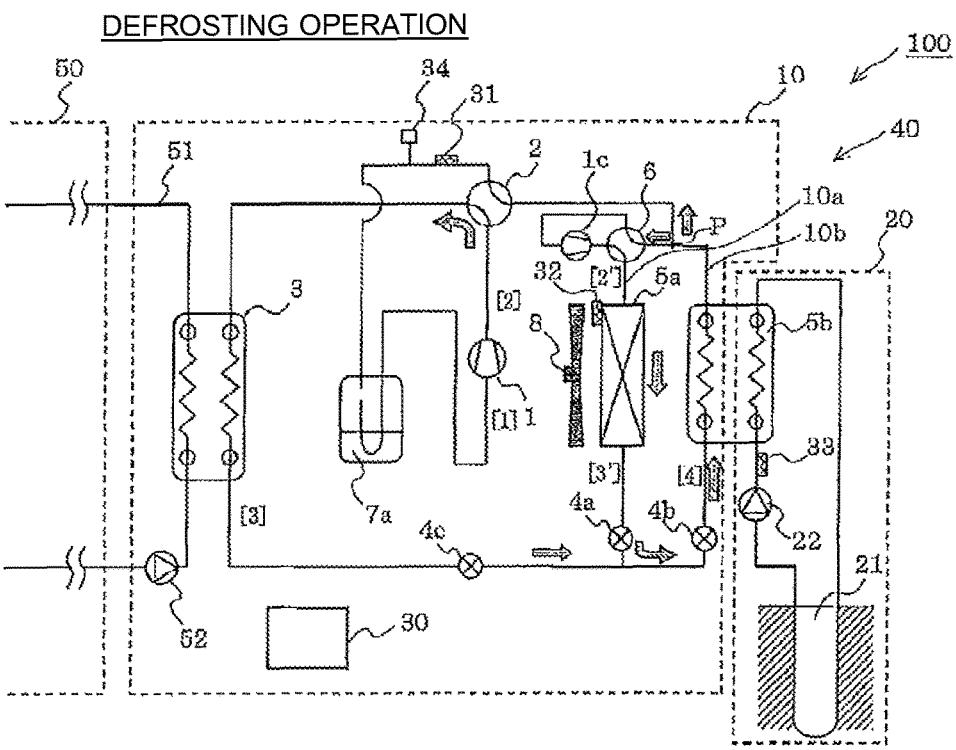
FIG. 22 is a diagram showing flow of the refrigerant during defrosting operation in Embodiment 4.

FIG. 22 is a diagram showing flow of the refrigerant during defrosting operation in Embodiment 4. FIG. 23 shows a p-h diagram (a diagram showing the relationship between the pressure and the specific enthalpy of the refrigerant) and is a diagram showing the relationship between the operation state and the temperature of the heat source side heat medium (the atmospheric temperature and the underground temperature) during defrosting operation in FIG. 22. Note that the geothermal temperature is higher than the air temperature. In addition, referring to FIG. 23, [i] (i=1, 2, . . . ) indicates a refrigerant state at each pipe position shown by [i] (i=1, 2, . . . ) in FIG. 22.

The low-temperature and low-pressure refrigerant (state [1]) is compressed by the compressor 1 into a high-temperature and high-pressure refrigerant (state [2]) and discharged from it. The high-temperature and high-pressure refrigerant discharged from the compressor 1 passes through the four-way valve 2 and flows into the water heat exchanger 3. The refrigerant having flowed into the water heat exchanger 3 rejects heat to the water in the water circuit 51 to become a low-temperature and high-pressure refrigerant (state [3]), flows out of the water heat exchanger 3, and then is reduced in pressure by the expansion valve 4c. The refrigerant having been reduced in pressure by the expansion valve 4c is further reduced in pressure by the expansion valve 4b of the sub-circuit 10b, flows into the earth-source heat exchanger 5b, and exchanges heat with the earth-source side medium to take away heat from it. Upon this heat exchange operation, geothermal heat is collected.

Then, the refrigerant having evaporated upon the collection of the geothermal heat divides into two streams at the junction and branch point P before the four-way valve 2, and one of the two streams flows into the four-way valve 2, passes through the refrigerant container 7a, and is drawn into the compressor 1 by suction. The other stream passes through the three-way valve 6, flows into the auxiliary compressor 1c, increases in temperature and pressure here into a high-temperature and high-pressure refrigerant (state [2']), and flows into the air-source heat exchanger 5a. Since the air-source heat exchanger 5a serves as a condenser, the refrigerant having flowed into the air-source heat exchanger 5a condenses into a low-temperature and high-pressure refrigerant (state [3']) upon rejecting heat to frost adhering on the air-source heat exchanger 5a or the atmosphere. The low-temperature and high-pressure refrigerant is reduced in pressure by the expansion valve 4a, joins the refrigerant having been reduced in pressure by the expansion valve 4c in the main circuit 10a, flows into the expansion valve 4b, and is further reduced in pressure into a refrigerant in state [4]. The refrigerant in state [4] flows into the earth-source heat exchanger 5b and exchanges heat with the earth-source side medium to take away heat from it to become a high-temperature and low-pressure refrigerant (state [1]) again.

In this defrosting operation, the amount of work of the compressor 1 is used by the water heat exchanger 3 as an amount of heat for heating on the load side, and the amount of work of the auxiliary compressor 1c is used as an amount of heat for defrosting of the air-source heat exchanger 5a.

Next, control action in defrosting operation in Embodiment 4 will be described. Note that particularly, actuator action different from that in Embodiment 3 will be described.

When the controller 30 determines that defrosting is required during heating operation, the controller 30 does not switch the flow path of the four-way valve 2 and keeps the flow path for heating, and switches the flow path of the three-way valve 6 such that the refrigerant having flowed out of the earth-source heat exchanger 5b flows into the auxiliary compressor 1c. By so doing, a part of the refrigerant, in the earth-source heat exchanger 5b, having collected the geothermal heat through the earth-source side medium in the earth-source side circuit 20 is increased in temperature and pressure by the auxiliary compressor 1c and then flows into the air-source heat exchanger 5a, and defrosting of the air-source heat exchanger 5a is performed. Then, when the controller 30 determines that the defrosting operation is to end, the controller 30 switches the flow path of the three-way valve 6 such that the side of the air-source heat exchanger 5a opposite to the expansion valve 4a is connected directly to the earth-source heat exchanger 5b without being connected via the auxiliary compressor 1c, stops the auxiliary compressor 1c, and performs heating operation again.

In addition, during defrosting operation, the controller 30 appropriately controls the expansion valve 4c to increase the amount of refrigerant flowing into the air-source heat exchanger 5a and reduce the amount of refrigerant flowing into the water heat exchanger 3. By so doing, it is possible to quickly end the defrosting of the air-source heat exchanger 5a. When the amount of refrigerant flowing into the water heat exchanger 3 is reduced, the capacity of heating the room decreases, and thus the expansion valve 4c may be controlled in view of balance between ensuring comfort in the room and promotion of defrosting.

As described above, in Embodiment 4, during heating operation, both the air-source heat exchanger 5a, which exchanges heat with the atmosphere as a heat source, and the earth-source heat exchanger 5b, which uses geothermal heat as a heat source, serve as evaporators to collect heat from both the atmosphere and another heat source. Then, during defrosting operation, the refrigerant having been increased in temperature and pressure by the auxiliary compressor 1c flows into the air-source heat exchanger 5a, and the flow path of the three-way valve 6 is switched such that geothermal heat is collected by the earth-source heat exchanger 5b and a part of the refrigerant flowing toward the water heat exchanger 3 flows into the air-source heat exchanger 5a. By so doing, it is possible to use the heat collected from the underground through the earth-source heat exchanger 5b, as an amount of heat for both heating and defrosting. Since the amount of heat that can be used for defrosting increases by the amount of heat collected from the underground, it is possible to reduce the defrosting period of time.

In addition, even during defrosting operation, the water heat exchanger 3 serves as a condenser to enable heating operation, and thus it is possible to restrain the comfort from being impaired during defrosting operation.

Moreover, in Embodiment 4, by adjusting the power input to each of the compressor 1 and the auxiliary compressor 1c, it is possible to make the condensing temperature of the water heat exchanger and the condensing temperature of the air-source heat exchanger different from each other as shown in FIG. 23. Thus, while the condensing temperature for heating (the condensing temperature of the water heat exchanger) is maintained, defrosting operation is enabled in which the condensing temperature of the air-source heat exchanger is not increased more than necessary, and it is possible to reduce the power consumption during defrosting. In other words, the condensing temperature of the air-source heat exchanger suffices to be a temperature that melts frost, and thus may be lower than the condensing temperature for heating, and it is possible to reduce the power consumption since it is possible to lower the condensing temperature.

It should be noted that in each embodiment described above, the example has been described in which geothermal heat is used as a heat source other than the atmosphere, but the heat source other than the atmosphere is not limited to geothermal heat, and groundwater, seawater, or solar hot water may be used as a heat source.

In addition, in general, it is possible to use heat generated by an electric heater or a boiler on the load side during heating operation as it is, but an amount of heat is insufficient when the geothermal heat or the heat of groundwater, seawater, or solar hot water that is lower than a temperature set for the load side is used as a heat source for making the load side at the set temperature. However, with the heat pump device 40 of each embodiment described above, it is possible to use the geothermal heat or the heat of groundwater, seawater, or solar hot water as a part of a heat source for defrosting, and it can be said that it is effective for reducing the power consumption during defrosting operation.

It should be noted that the configuration with the four-way valve 2 has been shown in each embodiment described above, but the four-way valve 2 is not necessarily essential and may be omitted in Embodiments 2 to 4.

In addition, in the case where a second switching device is provided in Embodiments 2 to 4, the second switching device is not limited to the four-way valve 2 similarly to Embodiment 1, a plurality of two-way passage switching valves or three-way passage switching valves may be used and configured such that flow of the refrigerant is switched in the same manner as the four-way valve 2.

Furthermore, Embodiments 2 to 4 have been described with the three-way valve 6 as an example of the first switching device, but the first switching device is not limited to the three-way valve 6 similarly to Embodiment 1. For example, a plurality of two-way passage switching valves may be used as the first switching device, or one flow path of a four-way valve may be closed, whereby it is configured that the flow of the refrigerant is switched in the same manner.

In addition, in each embodiment described above, the example of the air-conditioning system has been described as an apparatus to which the heat pump device 40 is applied, but the apparatus is not limited thereto and may be a hot-water supply system. In short, the apparatus may be a system that performs heat applying operation in which the refrigerant circulates such that the load side heat exchanger (the water heat exchanger 3) serves as a radiator and the air-source heat exchanger 5a serves as an evaporator.

INDUSTRIAL APPLICABILITY

A heat pump device including multiple heat sources is useful as an application example of the present invention.

The invention claimed is:
1. A heat pump device comprising:
a refrigerant circuit which includes
a main circuit in which a compressor, a refrigerant flow path of a load side heat exchanger, a first pressure reducing device, and a first heat source heat exchanger, which is configured to exchange heat with a first heat source, are connected in order, wherein
the first heat source is the atmosphere,
a refrigerant circulates through the main circuit, the main circuit has a first pipe that connects the first pressure reducing device to the load side heat exchanger, the main circuit has a second pipe that connects the first pressure reducing device to the first heat source heat exchanger, and the second pipe is separate from the first pipe, a sub-circuit in which a second pressure reducing device and a refrigerant flow path of a second heat source heat exchanger are connected in series, wherein the sub-circuit has a first end and a second end, and the first end is connected with a branch pipe branching from the first pipe, a first switching device connected to the second end of the sub-circuit and configured to switch a connection of the refrigerant flow path of the second heat source heat exchanger;

a heat exchange medium circuit, which includes a heat exchange medium flow path of the second heat source heat exchanger, wherein a heat exchange medium that exchanges heat with a second heat source, which is different from the atmosphere, circulates through the heat exchange medium circuit to take away heat of the second heat source; and a controller configured to control the first switching device, wherein during a defrosting operation, wherein the controller causes the first heat source heat exchanger to serve as a radiator and the second heat source heat exchanger to serve as an evaporator, switches the first switching device to connect the refrigerant flow path of the second heat source heat exchanger with a suction side of the compressor, and allows the second heat source heat exchanger to exchange heat between the main circuit and the sub-circuit to use the second heat source upon for defrosting the first heat source heat exchanger.

2. The heat pump device of claim 1, further comprising a second switching device provided on a discharge side of the compressor, wherein during the defrosting operation, the controller switches the second switching device to cause the first heat source heat exchanger to serve as a radiator and the second heat source heat exchanger to serve as an evaporator.

3. The heat pump device of claim 1, further comprising:
a second switching device provided on a discharge side of the compressor;
a defrosting circuit which is formed by blocking a part of a flow path of the refrigerant circuit and in which the refrigerant circulates between the first heat source heat exchanger and the second heat source heat exchanger; and
a refrigerant pump which is provided on the defrosting circuit and configured to circulate the refrigerant,
wherein during the defrosting operation, the controller performs defrosting using either one of:
a method in which the second switching device is switched such that the first heat source heat exchanger serves as a radiator and the second heat source heat exchanger serves as an evaporator, and the first switching device is switched to the suction side of the compressor to perform defrosting; and
a method in which the compressor is stopped, the defrosting circuit is formed, and the refrigerant pump is operated to circulate, through the defrosting circuit, the refrigerant having collected the heat of the second heat source from the heat exchange medium circuit via the second heat source heat exchanger, thereby performing defrosting.

4. The heat pump device of claim 1, further comprising:
a second switching device provided on a discharge side of the compressor; and
a defrosting circuit which is formed by blocking a part of a flow path of the refrigerant circuit and in which the refrigerant circulates between the first heat source heat exchanger and the second heat source heat exchanger,
wherein the first heat source heat exchanger is disposed at a position higher than the second heat source heat exchanger and configured such that the refrigerant having collected the heat of the second heat source from the heat exchange medium circuit via the second heat source heat exchanger undergoes natural circulation through the defrosting circuit, and
during the defrosting operation, the controller performs defrosting using either one of:
a method in which the second switching device is switched such that the first heat source heat exchanger serves as a radiator and the second heat source heat exchanger serves as an evaporator, and the first switching device is switched to the suction side of the compressor to perform defrosting; and
a method in which the compressor is stopped, the defrosting circuit is formed, and defrosting is performed by natural circulation.

5. The heat pump device of claim 1, wherein
the main circuit is configured such that a connection destination, on a side opposite to the first pressure reducing device, of the first heat source heat exchanger is switched by the first switching device,
the sub-circuit is configured such that an end, opposite to the second pressure reducing device, of the refrigerant flow path of the second heat source heat exchanger is connected to the end of the compressor on the suction side thereof,
the refrigerant circuit is configured to perform at least heat applying operation in which the refrigerant circulates such that the load side heat exchanger serves as a radiator and the first heat source heat exchanger serves as an evaporator, by switching the first switching device such that the connection destination, on the side opposite to the first pressure reducing device, of the first heat source heat exchanger is on a junction and branch point side with respect to the second heat source heat exchanger, and
during the defrosting operation, the controller switches the first switching device so that the connection destination, on the side opposite to the first pressure reducing device, of the first heat source heat exchanger is on a discharge side of the compressor, and allows a part of the refrigerant discharged from the compressor to flow into the first heat source heat exchanger.

6. The heat pump device of claim 1, further comprising an auxiliary compressor provided between the junction and branch point of the refrigerant circuit and the first heat source heat exchanger via the first switching device,
wherein the main circuit is configured such that a connection destination, on a side opposite to the first pressure reducing device, of the first heat source heat exchanger is switched by the first switching device,
the sub-circuit is configured such that an end, opposite to the second pressure reducing device, of the refrigerant flow path of the second heat source heat exchanger is connected to the end of the compressor on the suction side thereof, the refrigerant circuit is configured to perform at least heat applying operation in which the refrigerant circulates such that the load side heat exchanger serves as a radiator and the first heat source heat exchanger serves as an evaporator, by switching the first switching device such that the connection destination, on the side opposite to the first pressure reducing device, of the first heat source heat exchanger is on a junction and branch point side with respect to the second heat source heat exchanger, and during the defrosting operation, the controller switches the first switching device so that the connection destination, on the side opposite to the first pressure reducing device, of the first heat source heat exchanger is on a discharge side of the auxiliary compressor, and causes a part of the refrigerant having flowed out of the refrigerant flow path of the second heat source heat exchanger to be compressed by the auxiliary compressor and flow into the first heat source heat exchanger.

7. The heat pump device of claim 1, wherein a heat source having a temperature lower than a temperature set for a load side device in which the load side heat exchanger is installed is used as the second heat source.

8. The heat pump device of claim 7, wherein any one of geothermal heat, groundwater, seawater, and solar hot water is used as the second heat source.

* * * * *